US007525614B2

(12) United States Patent
Jeong et al.

(10) Patent No.: US 7,525,614 B2
(45) Date of Patent: Apr. 28, 2009

(54) FRINGE FIELD SWITCHING MODE TRANSFLECTIVE LCD HAVING SLITS IN THE REFLECTIVE AREA OF A PIXEL ELECTRODE THAT HAVE AN INCLINATION ANGLE GREATER THAN SLITS IN THE TRANSMISSIVE AREA BY ABOUT 10 TO 40 DEGREES

(75) Inventors: Youn Hak Jeong, Kyoungki-do (KR); Hyang Yul Kim, Kyoungki-do (KR); Jun Baek Park, Kyoungki-do (KR); Kwi Hyun Kim, Kyoungki-do (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 317 days.

(21) Appl. No.: 11/215,230

(22) Filed: Aug. 30, 2005

(65) Prior Publication Data

US 2006/0256268 A1      Nov. 16, 2006

(30) Foreign Application Priority Data

May 11, 2005      (KR) .................... 10-2005-0039251

(51) Int. Cl.
*G02F 1/1335*      (2006.01)
(52) U.S. Cl. ...................................... 349/114; 349/113
(58) Field of Classification Search ................ 349/113, 349/114, 141
See application file for complete search history.

(56) References Cited

U.S. PATENT DOCUMENTS

| 7,239,365 B2 * | 7/2007 | Chang et al. ............. 349/114 |
| 2003/0095217 A1 * | 5/2003 | Sakamoto et al. ........... 349/106 |
| 2003/0210484 A1 * | 11/2003 | Otake et al. ............... 359/881 |
| 2003/0218664 A1 * | 11/2003 | Sakamoto et al. .......... 347/114 |
| 2004/0032555 A1 * | 2/2004 | Jin et al. ................... 349/114 |
| 2005/0024563 A1 * | 2/2005 | Jang et al. ................. 349/117 |
| 2005/0083462 A1 | 4/2005 | Lin |
| 2007/0040978 A1 * | 2/2007 | Nakayoshi et al. .......... 349/141 |

FOREIGN PATENT DOCUMENTS

| JP | 2004-341342 | 12/2004 |
| WO | WO 2005006068 A1 * | 1/2005 |

OTHER PUBLICATIONS

Lee, Gak Seok et al. "Optimization of Electrode Structure for Single Gamma in a Transflective IPS LCD." May 2005. SID 05 Digest, p. 738-741.*

* cited by examiner

*Primary Examiner*—David Nelms
*Assistant Examiner*—John Heyman

(57) ABSTRACT

Disclosed is a fringe field switching mode transflective liquid crystal display capable of displaying high quality images. The transflective liquid crystal display includes a lower substrate having a counter electrode and a pixel electrode, an upper substrate aligned in opposition to the lower substrate by interposing a liquid crystal layer therebetween, an upper polarizing plate, a lower polarizing plate, a reflective plate provided at an inner portion of the lower substrate, a lower λ/2 plate, and an upper λ/2 plate. An inclination angle, a slit width and a slit interval of the pixel electrode of the reflective area are different from those of the pixel electrode of the transmissive area. The liquid crystal layer presents a phase delay of about 0 to λ/4 in the reflective area and presents a phase delay of about 0 to λ/2 in the transmissive area.

12 Claims, 18 Drawing Sheets transmissive area        reflective area transmissive area    reflective area

FRINGE FIELD SWITCHING MODE TRANSFLECTIVE LCD HAVING SLITS IN THE REFLECTIVE AREA OF A PIXEL ELECTRODE THAT HAVE AN INCLINATION ANGLE GREATER THAN SLITS IN THE TRANSMISSIVE AREA BY ABOUT 10 TO 40 DEGREES

BACKGROUND OF THE INVENTION

1. Field of the Invention

The present invention relates to a fringe field switching mode transflective liquid crystal display. More particularly, the present invention relates to a fringe field switching mode transflective liquid crystal display capable of displaying high quality images with wide viewing angles.

2. Description of the Prior Art

As generally known in the art, liquid crystal displays are classified into transmissive liquid crystal displays using backlight units as light sources thereof and reflective liquid crystal displays using natural light as light sources thereof. Since the transmissive liquid crystal display employs the backlight unit to generate light, it can display bright images in dark places. However, such a backlight unit may increase power consumption of the transmissive liquid crystal display. In contrast, the reflective liquid crystal display uses natural light as a light source without employing the backlight unit, so it can display images with low power consumption. However, the reflective liquid crystal display cannot be used in dark places.

To solve the above problems of the transmissive and reflective liquid crystal displays, transflective liquid crystal displays have been suggested. The transflective liquid crystal display can be selectively used as a transmissive liquid crystal display or a reflective liquid crystal display depending on operational environment thereof, so it can display images with relatively low power consumption in the bright places while displaying images by using the backlight unit in the dark places.

Conventional transflective liquid crystal displays have a single cell gap structure in which a cell gap (dt) of a transmissive area is identical to a cell gap (dr) of a reflective area as shown in FIG. 1, or a dual gap structure in which a cell gap (dt) of a transmissive area is larger than a cell gap (dr) of a reflective area by approximately two times as shown in FIG. 3. In FIGS. 1 and 3, reference numerals 1, 2a, 2b, 3, 4, 5 and 6 represent a lower substrate, a pixel electrode, a reflective electrode, an upper substrate, a common electrode, liquid crystal and an organic insulative layer, respectively.

However, according to the conventional transflective liquid crystal display having the single cell gap structure as shown in FIG. 1, a phase delay ($\Delta n \cdot d$) of the reflective area is twice larger than that of the transmissive area, so that a V-R curve in a reflective mode does not match with a V-T curve in a transmissive mode as shown in FIG. 2, thereby causing incorrect grayscales and inferior electro-optical characteristics of the liquid crystal display.

For this reason, the conventional transflective liquid crystal display having the dual cell gap structure has been recently used. According to the conventional transflective liquid crystal display having the dual cell gap structure, although the cell gap of the reflective area is about a half of the cell gap of the transmissive area, an optical path of the reflective area is twice larger than that of the transmissive area, so that the phase delay of the reflective area is identical to that of the transmissive area. Thus, as shown in FIG. 4, the V-R curve may easily match with the V-T curve. Accordingly, the conventional transflective liquid crystal display having the dual cell gap structure can prevent the incorrect grayscales while improving electro-optical characteristics thereof in comparison with the conventional transflective liquid crystal display having the single cell gap structure.

However, the conventional transflective liquid crystal display having the dual cell gap structure may present a great step difference, which is twice larger than that of the conventional transflective liquid crystal display having the single cell gap structure, due to a cell gap difference between the transmissive area and the reflective area, so the liquid crystal may be unevenly aligned. For this reason, it is difficult to fabricate the conventional transflective liquid crystal display having the dual cell gap structure, so that productivity thereof may be lowered. In addition, the liquid crystal adjacent to an alignment layer may be incompletely aligned as an electric field is applied thereto, thereby causing narrow viewing angles.

SUMMARY OF THE INVENTION

Accordingly, the present invention has been made to solve the above-mentioned problems occurring in the prior art, and an object of the present invention is to provide a fringe field switching mode transflective liquid crystal display capable of displaying high quality images with wide viewing angles while facilitating the manufacturing process thereof with high productivity when a dual cell gap structure is applied thereto and effectively matching a V-R curve with a V-T curve when a single cell gap structure is applied thereto.

In order to accomplish the above object, according one aspect of the present invention, there is provided a fringe field switching mode transflective liquid crystal display having a dual cell gap structure, in which a cell gap of a transmissive area is different from a cell gap of a reflective area, the fringe field switching mode transflective liquid crystal display comprising: a lower substrate having a counter electrode and a pixel electrode in a form of a slit; an upper substrate aligned in opposition to the lower substrate; a liquid crystal layer interposed between the lower and upper substrates; an upper polarizing plate aligned at an outer portion of the upper substrate; a lower polarizing plate aligned at an outer portion of the lower substrate; a reflective plate provided at an inner portion of the lower substrate in the reflective area by interposing an organic resin layer therebetween; a lower $\lambda/2$ plate provided between the lower substrate having the reflective plate and the lower polarizing plate; and an upper $\lambda/2$ plate provided between the upper substrate and the upper polarizing plate, wherein an inclination angle, a slit width and a slit interval of the pixel electrode formed in the reflective area are different from those of the pixel electrode formed in the transmissive area, a phase delay of the liquid crystal layer formed in the reflective area is in a range of about 0 to $\lambda/4$, and a phase delay of the liquid crystal layer formed in the transmissive area is in a range of about 0 to $\lambda/2$.

The inclination angle of the pixel electrode formed in the reflective area is larger than the inclination angle of the pixel electrode formed in the transmissive area by about 10 to 40°.

The slit width and the slit interval of the pixel electrode formed in the reflective area are identical to those of the pixel electrode formed in the transmissive area.

The slit width and the slit interval of the pixel electrode formed in the reflective area are smaller than those of the pixel electrode formed in the transmissive area by less than 2 μm.

A phase delay value of the upper and lower $\lambda/2$ plates is about 250 to 400 nm.

The liquid crystal layer has a phase delay value of about 100 to 200 nm in the reflective area.

The liquid crystal layer has a phase delay value of about 250 to 400 nm in the transmissive area.

A transmissive axis of the lower polarizing plate matches with a transmissive axis of the upper polarizing plate, and optical axes of the upper and lower λ/2 plates are twisted from transmissive axes of the upper and lower polarizing plates at an angle of 15°.

The organic resin layer is formed at an upper surface thereof with a plurality of embossing patterns.

The organic resin layer has a thickness of about 600 to 2000 nm.

The embossing pattern has a diameter of about 3 to 10 μm and a height of about 700 to 800 nm from the upper surface of the organic resin layer. A distance between the embossing patterns is at least 2 μm and the embossing pattern has an inclination angle of about 5 to 15°.

According to another aspect of the present invention, there is provided a fringe field switching mode transflective liquid crystal display having a single cell gap structure, in which a cell gap of a transmissive area is identical to a cell gap of a reflective area, the fringe field switching mode transflective liquid crystal display comprising: a lower substrate having a counter electrode and a pixel electrode in a form of a slit; an upper substrate aligned in opposition to the lower substrate; a liquid crystal layer interposed between the lower and upper substrates; an upper polarizing plate aligned at an outer portion of the upper substrate; a lower polarizing plate aligned at an outer portion of the lower substrate; a reflective plate provided at an inner portion of the lower substrate in the reflective area; an upper λ/4 plate provided between the lower substrate having the reflective plate and the liquid crystal layer; and a lower λ/4 plate provided between the lower substrate and the lower polarizing plate, wherein an inclination angle, a slit width and a slit interval of the pixel electrode formed in the reflective area are different from those of the pixel electrode formed in the transmissive area, a phase delay of the liquid crystal layer formed in the reflective area is in a range of about 0 to λ/2, and a phase delay of the liquid crystal layer formed in the transmissive area is in a range of about 0 to λ/2.

The inclination angle of the pixel electrode formed in the reflective area is larger than the inclination angle of the pixel electrode formed in the transmissive area by about 10 to 40°.

The slit width and the slit interval of the pixel electrode formed in the reflective area are identical to those of the pixel electrode formed in the transmissive area, or smaller than those of the pixel electrode formed in the transmissive area by less than 2 μm.

A phase delay value of the upper and lower λ/4 plates is about 100 to 200 nm.

The liquid crystal layer has a phase delay value of about 250 to 400 nm in the reflective area and the transmissive area.

An organic resin layer having a plurality of embossing patterns is provided between the lower substrate and the counter electrode in the reflective area.

The embossing pattern has a diameter of about 3 to 10 μm and a height of about 700 to 800 nm from the upper surface of the organic resin layer. A distance between the embossing patterns is at least 2 μm and the embossing pattern has an inclination angle of about 5 to 15°.

A transmissive axis of the lower polarizing plate matches with an initial rubbing direction of the liquid crystal layer, a transmissive axis of the upper polarizing plate is orthogonal to the lower polarizing plate, an optical axis of the lower λ/4 plate is orthogonal to an optical axis of the upper λ/4 plate, and the upper λ/4 plate forms an angle of 45° in relation to an initial rubbing axis of the liquid crystal layer.

According to still another embodiment of the present invention, there is provided a fringe field switching mode transflective liquid crystal display having a single cell gap structure, in which a cell gap of a transmissive area is identical to a cell gap of a reflective area, the fringe field switching mode transflective liquid crystal display comprising: a lower substrate having a counter electrode and a pixel electrode; an upper substrate aligned in opposition to the lower substrate; a liquid crystal layer interposed between the lower and upper substrates; an upper polarizing plate aligned at an outer portion of the upper substrate; a lower polarizing plate aligned at an outer portion of the lower substrate; a reflective plate provided at an inner portion of the lower substrate in the reflective area; and a λ/4 plate provided between the lower substrate having the reflective plate and the liquid crystal layer, wherein an inclination angle, a slit width and a slit interval of the pixel electrode formed in the reflective area are different from those of the pixel electrode formed in the transmissive area, and the λ/4 plate is patterned such that the transmissive area of the reflective plate is opened.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present invention will be described with reference to accompanying drawings.

According to the present invention, a transflective liquid crystal display having a single cell gap structure or a dual cell gap structure includes a reflective area and a transmissive area, in which an inclination angle of a pixel electrode in the form of a slit, a width of the slit and an interval between slits of the reflective area are different from those of the transmissive area, thereby increasing the driving voltage and matching a V-R curve in a reflective mode with a V-T curve in a transmissive mode. In addition, liquid crystal is horizontally driven by means of a fringe field, thereby ensuring a wide viewing angle.

Figure 5:
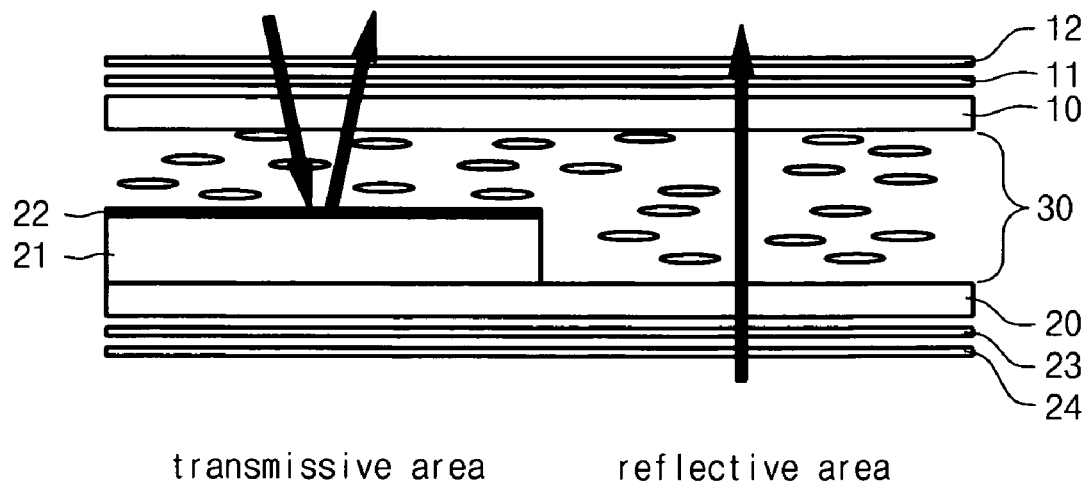
FIG. 5 is a sectional view illustrating an optical cell structure of a fringe field switching mode transflective liquid crystal display having a dual cell gap structure according to a first embodiment of the present invention.

FIG. 5 is a sectional view illustrating an optical cell structure of a fringe field switching mode transflective liquid crystal display having a dual cell gap structure according to a first embodiment of the present invention.

As shown in FIG. 5, the fringe field switching mode transflective liquid crystal display having the dual cell gap structure according to the first embodiment of the present invention includes a reflective area and a transmissive area, wherein an upper substrate 10 is aligned in opposition to a lower substrate 20 by interposing a liquid crystal layer 30 therebetween. An upper $\lambda/2$ plate 11 and an upper polarizing plate 12 are sequentially aligned at an outer portion of the upper substrate 10. An organic insulation layer 21 and a reflective plate 22 are sequentially formed at an inner portion of the lower substrate 20 in opposition to the reflective area. In addition, a lower polarizing plate 24 is aligned at an outer portion of the lower substrate 20 and a lower $\lambda/2$ plate 23 is provided between the lower substrate 20 and the lower polarizing plate 24.

A phase delay value between the upper $\lambda/2$ plate 11 aligned between the upper substrate 10 and the upper polarizing plate 12 and the lower $\lambda/2$ plate 23 aligned between the lower substrate 20 and the lower polarizing plate 24 is about 250 to 400 nm.

In addition, a cell gap of the reflective area is about a half of a cell gap of the transmissive area. Thus, the liquid crystal layer 30 of the reflective area presents the phase delay of about $\lambda/4$ when the electric field is not applied thereto. If the electric field is applied to the liquid crystal layer 30 of the reflective area, the phase delay is converged into 0. In addition, the liquid crystal layer 30 of the transmissive area presents the phase delay of about $\lambda/2$ when the electric field is not applied thereto. If the electric field is applied to the liquid crystal layer 30 of the transmissive area, the phase delay is converged into 0. The liquid crystal layer 30 of the reflective area has the phase delay value of about 100 to 200 nm in order to cause the phase delay of about $\lambda/4$, and the liquid crystal layer 30 of the transmissive area has the phase delay value of about 250 to 400 nm in order to cause the phase delay of about $\lambda/2$.

Figure 6:
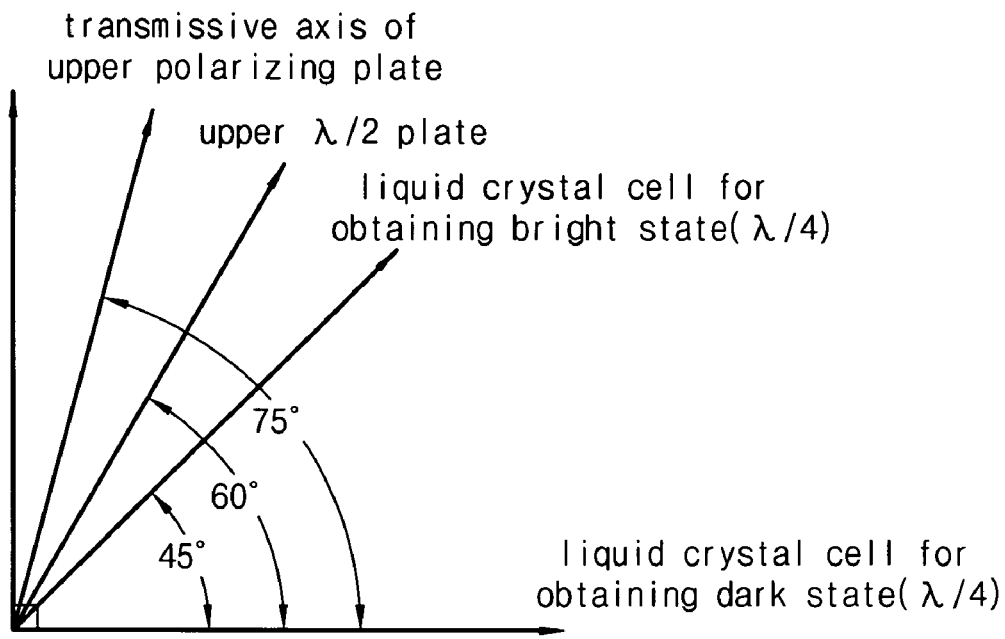
FIG. 6 is a view illustrating an optical axis of a reflective area provided in a fringe field switching mode transflective liquid crystal display having a dual cell gap structure according to a first embodiment of the present invention.
Figure 7:
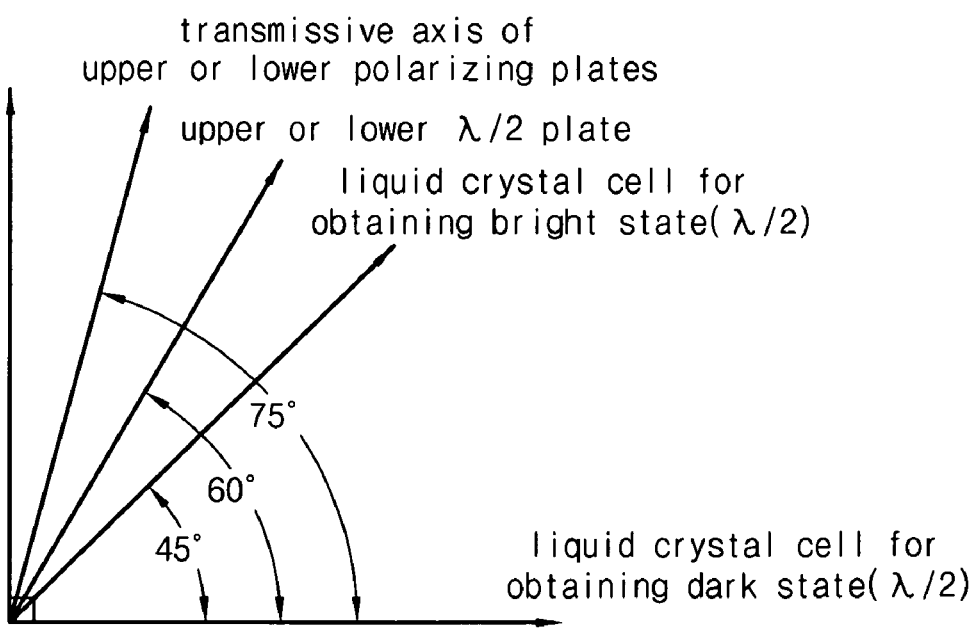
FIG. 7 is a view illustrating an optical axis of a transmissive area provided in a fringe field switching mode transflective liquid crystal display having a dual cell gap structure according to a first embodiment of the present invention.

Under the above optical cell structure, each optical member has an optical axis as follows:

FIG. 6 is a view illustrating the optical axis of the reflective area provided in the fringe field switching mode transflective liquid crystal display having the dual cell gap structure according to the first embodiment of the present invention, and FIG. 7 is a view illustrating the optical axis of the transmissive area provided in the fringe field switching mode transflective liquid crystal display having the dual cell gap structure according to the first embodiment of the present invention. Referring to FIGS. 6 and 7, a transmissive axis of the lower polarizing plate 24 matches with a transmissive axis of the upper polarizing plate 12 and optical axes of the upper and lower $\lambda/2$ plates 11 and 23 are twisted with regard to transmissive axes of the upper and lower polarizing plates 12 and 24 at an angle of 15°.

Figure 8:
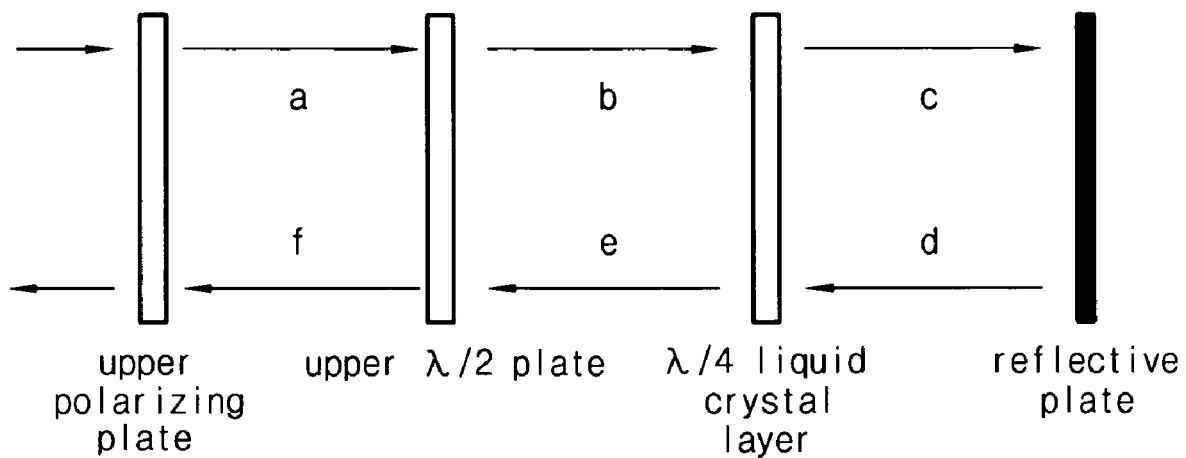
FIG. 8 is a view illustrating an operational principle of a reflective area provided in a fringe field switching mode transflective liquid crystal display having a dual cell gap structure according to a first embodiment of the present invention.
Figure 9:
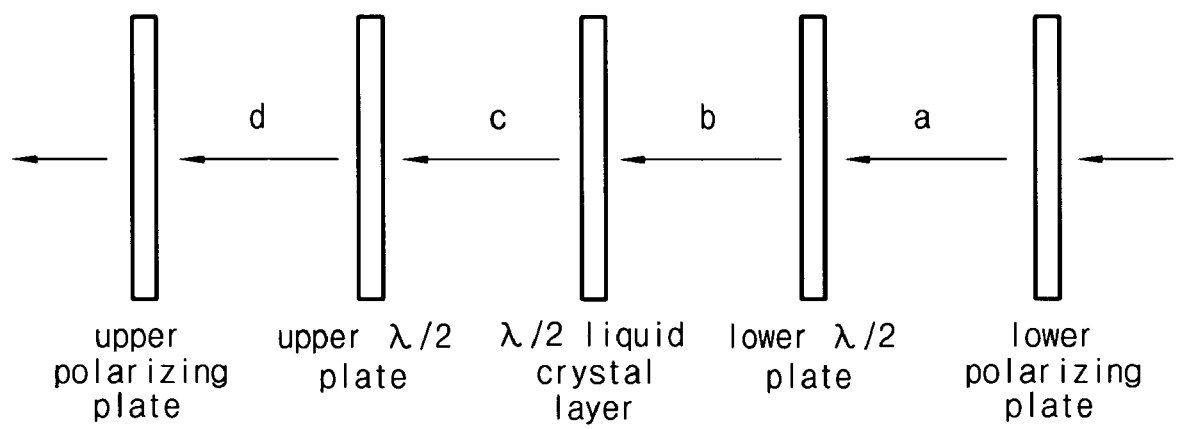
FIG. 9 is a view illustrating an operational principle of a transmissive area provided in a fringe field switching mode transflective liquid crystal display having a dual cell gap structure according to a first embodiment of the present invention.

FIG. 8 is a view illustrating an operational principle of the reflective area provided in the fringe field switching mode transflective liquid crystal display having the dual cell gap structure according to the first embodiment of the present invention, and FIG. 9 is a view illustrating an operational principle of the transmissive area provided in the fringe field switching mode transflective liquid crystal display having the dual cell gap structure according to the first embodiment of the present invention.

First, the operational principle for the dark state in the reflective area will be described.

As shown in FIG. 8, incident light is linearly polarized at an angle of 75° while passing through the upper polarizing plate 12 (see, a in FIG. 8), and then linearly polarized at an angle of 45° while passing through the upper λ/2 plate 11 having an optical axis twisted at an angle of 60° (see, b in FIG. 8). Then, the light linearly polarized at an angle of 45° is circularly polarized while passing through the liquid crystal layer 30, which is rubbed at a rubbing angle of 0° (see, c in FIG. 8), and is reflected from the reflective plate 22 (see, d in FIG. 8). After that, the light is linearly polarized at an angle of −45° while passing through the liquid crystal layer 30 (see, e in FIG. 8). In addition, the light linearly polarized at an angle of −45° is again linearly polarized while passing through the upper λ/2 plate 11 so that the linearly polarized light has an angle of 165°, which has been twisted by an angle of 90° as compared with the optical axis of the incident light. Thus, the light is twisted from the polarizing direction of the upper polarizing plate 12 at an angle of 90°, so that the light is shield, thereby forming the dark state in the reflective area.

In addition, in order to obtain the bright state in the reflective area, the incident light is linearly polarized at an angle of 75° while passing through the upper polarizing plate 12 (see, a in FIG. 8), and then linearly polarized at an angle of 45° while passing through the upper λ/2 plate 11 having the optical axis twisted at an angle of 60° (see, b in FIG. 8). At this time, since liquid crystal is aligned in the direction of 45° due to the electric field applied to the liquid crystal layer 30, the optical axis of the linearly polarized light matches with an alignment axis of the liquid crystal, so the polarizing state of the light, which is reflected from the reflective plate, may not change even if it passes through the liquid crystal layer 30 (see, e in FIG. 8). Then, the light passes through the upper λ/2 plate 11 while matching with the polarizing axis of the upper polarizing plate 12 so that the bright state can be obtained.

Hereinafter, the operational principle in the transmissive area will be described.

In order to obtain the dark state in the transmissive area, as shown in FIG. 9, incident light is linearly polarized at an angle of 75° while passing through the lower polarizing plate 24 (see, a in FIG. 9), and then linearly polarized at an angle of 45° while passing through the lower λ/2 plate 23 having an optical axis twisted at an angle of 60° (see, b in FIG. 9). Then, the light is linearly polarized at an angle of −45° while passing through the liquid crystal layer 30, which is aligned at an angle of 0° and presents the phase delay of λ/2 (see, c in FIG. 9). In addition, the light is again linearly polarized while passing through the upper λ/2 plate 11 having an optical axis twisted at an angle of 60° so that the linearly polarized light has an angle of 165°, which has been twisted at an angle of 90° with regard to the transmissive axis of the upper polarizing plate 12. Thus, the light is shield, thereby forming the dark state in the transmissive area.

In addition, in order to obtain the bright state in the transmissive area, the incident light is linearly polarized at an angle of 75° while passing through the lower polarizing plate 24 (see, a in FIG. 9), and then linearly polarized at an angle of 45° while passing through the lower λ/2 plate 23 having the optical axis twisted at an angle of 60° (see, b in FIG. 9). At this time, since liquid crystal is aligned in the direction of 45° due to the electric field applied to the liquid crystal layer 30, the optical axis of the linearly polarized light matches with an alignment axis of the liquid crystal, so the polarizing state of the light may not change even if it passes through the liquid crystal layer 30 (see, c in FIG. 9). Then, the light is linearly polarized at an angle of 75° while passing through the upper λ/2 plate 11 having the optical axis twisted at an angle of 60°, so that the optical axis of the light matches with the polarizing axis of the upper polarizing plate 12, thereby forming the bright state in the transmissive area.

Figure 11:
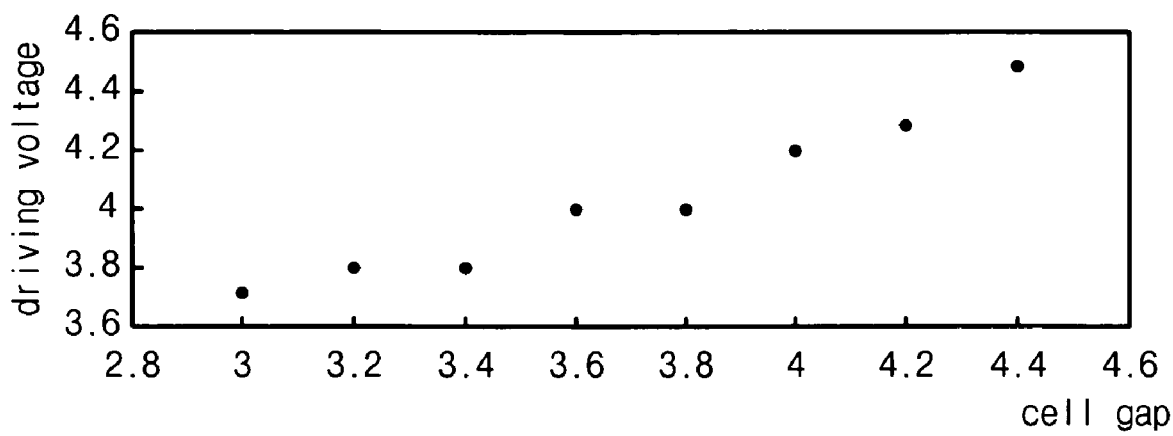
FIG. 11 is a graph illustrating a relationship between a cell gap and a driving voltage in a fringe field switching mode transflective liquid crystal display according to the present invention.

There are various factors exerting a serious influence upon the transflective liquid crystal display having the dual cell gap structure. FIG. 11 is a graph illustrating a relationship between the cell gap and the driving voltage in the fringe field switching mode transflective liquid crystal display according to the present invention. As can be understood from FIG. 11, the cell gap may exert an influence upon the range of the driving voltage in the transflective liquid crystal display having the dual cell gap structure.

Figure 10:
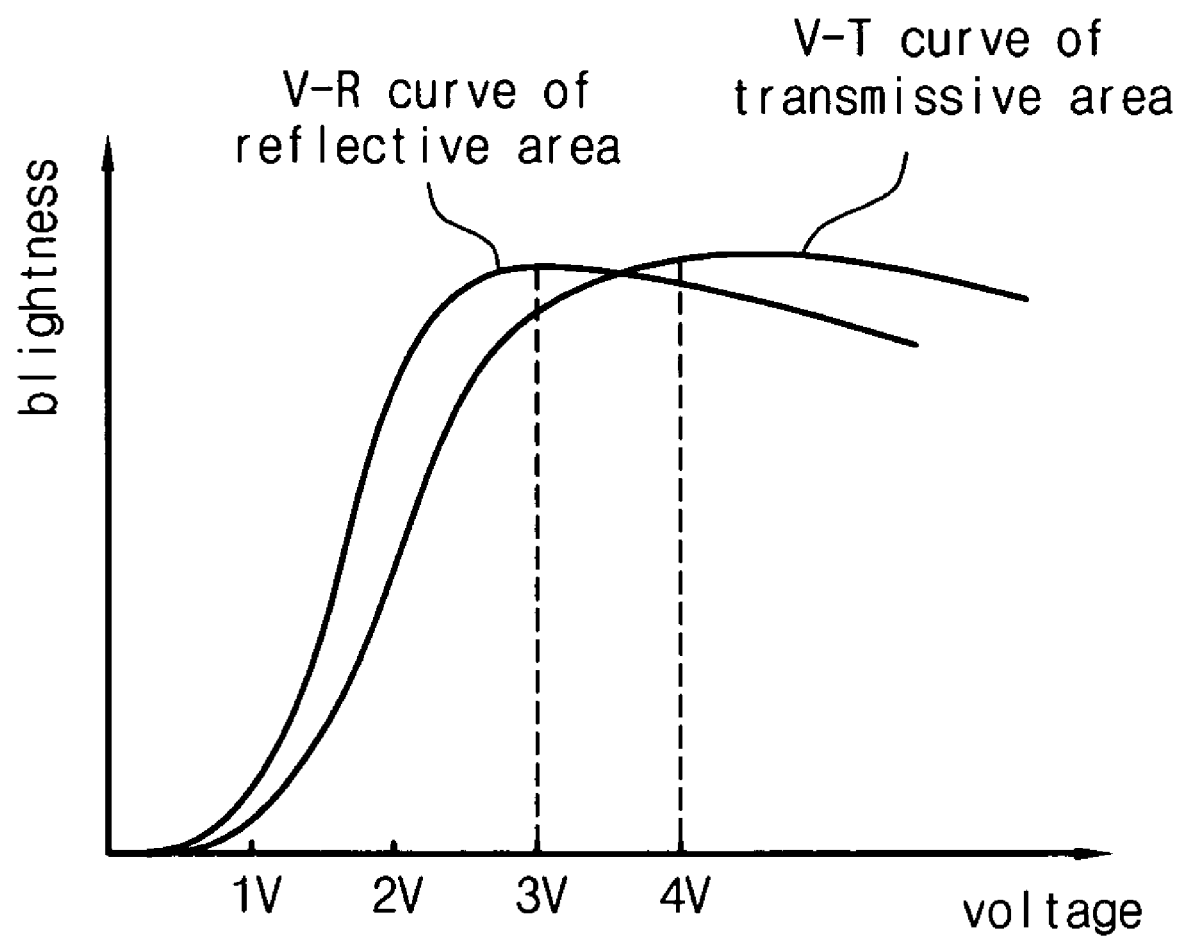
FIG. 10 is a graph illustrating a V-T curve in a transmissive mode and a V-R curve in a reflective mode in a fringe field switching mode transflective liquid crystal display having a dual cell gap structure according to the present invention.

That is, according to the dual cell gap structure, the cell gap of the reflective area is about a half of the cell gap of the transmissive area. Thus, in a case of an FFS mode, the driving voltage becomes lowered as the cell gap is reduced. For instance, if the cell gap of the transmissive area is 4 μm and the cell gap of the reflective area is 2 μm, as shown in FIG. 10, the driving voltage of the transmissive area is about 4V and the driving voltage of the reflective area is about 3V, which is smaller than the driving voltage of the transmissive area by 1V. That is, the driving voltage may be lowered by 0.5V if the cell gap is reduced by 1 μm.

Figure 12:
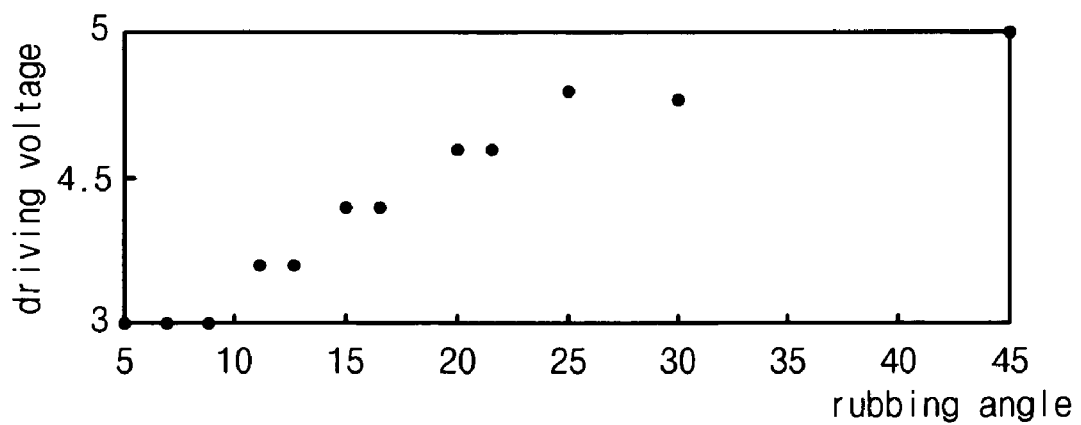
FIG. 12 is a graph illustrating a relationship between a rubbing angle and a driving voltage in a fringe field switching mode transflective liquid crystal display according to the first embodiment of the present invention.

As mentioned above, the cell gap of the reflective area is different from the cell gap of the transmissive area in the dual cell gap structure, so the driving voltage of the reflective area is also different from the driving voltage of the transmissive area. Thus, the V-R (voltage-reflectance) curve of the reflective area does not match with the V-T (voltage-transmittance) curve of the transmissive area. Therefore, it is necessary to match the driving range of the reflective area with the driving range of the transmissive area. To this end, a slit angle of a pixel electrode in the reflective area must be set differently from a silt angle of a pixel electrode in the transmissive area. FIG. 12 is a graph illustrating a relationship between the rubbing angle and the driving voltage in the fringe field switching mode transflective liquid crystal display having the dual cell gap structure according to the first embodiment of the present invention. It can be understood from FIG. 12 that the driving voltage becomes increased as the angle between the pixel electrode and the rubbing direction is enlarged.

Figure 13:
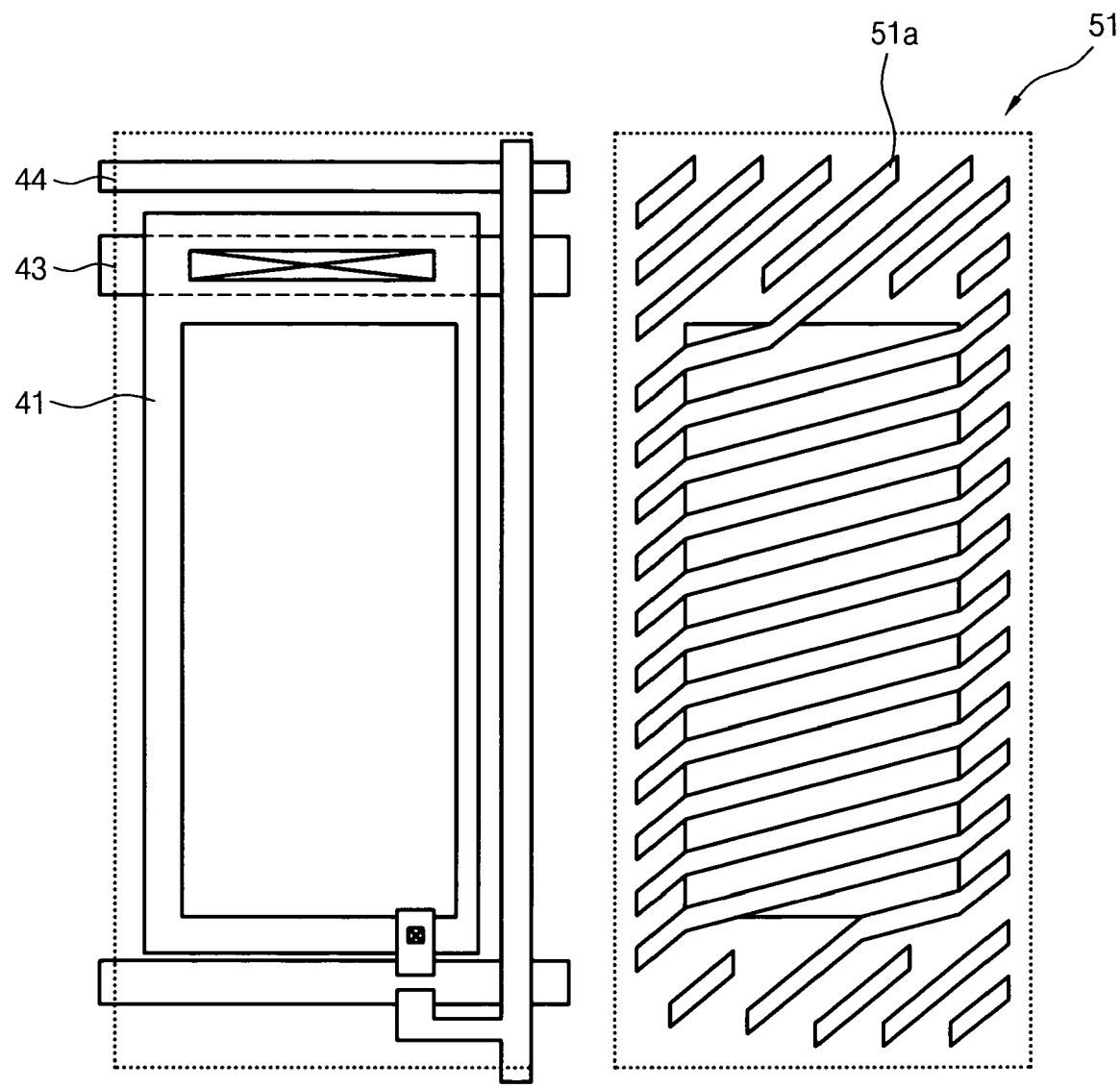
FIGS. 13 to 15 are plan and sectional views illustrating array pixel structures of a fringe field switching mode transflective liquid crystal display having a dual cell gap structure according to a first embodiment of the present invention.
Figure 14:
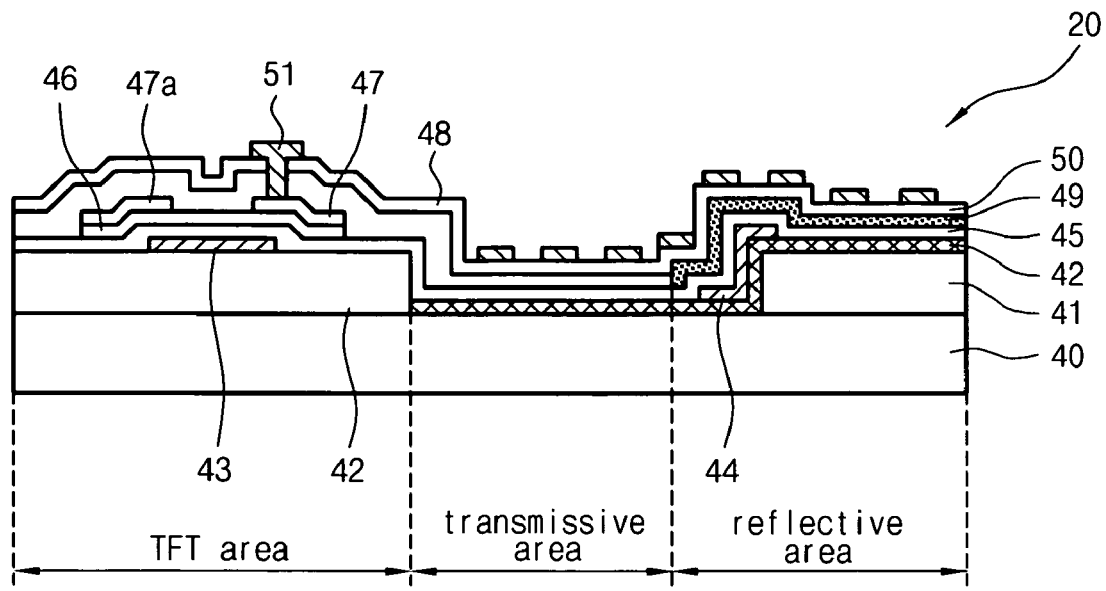
Figure 15:
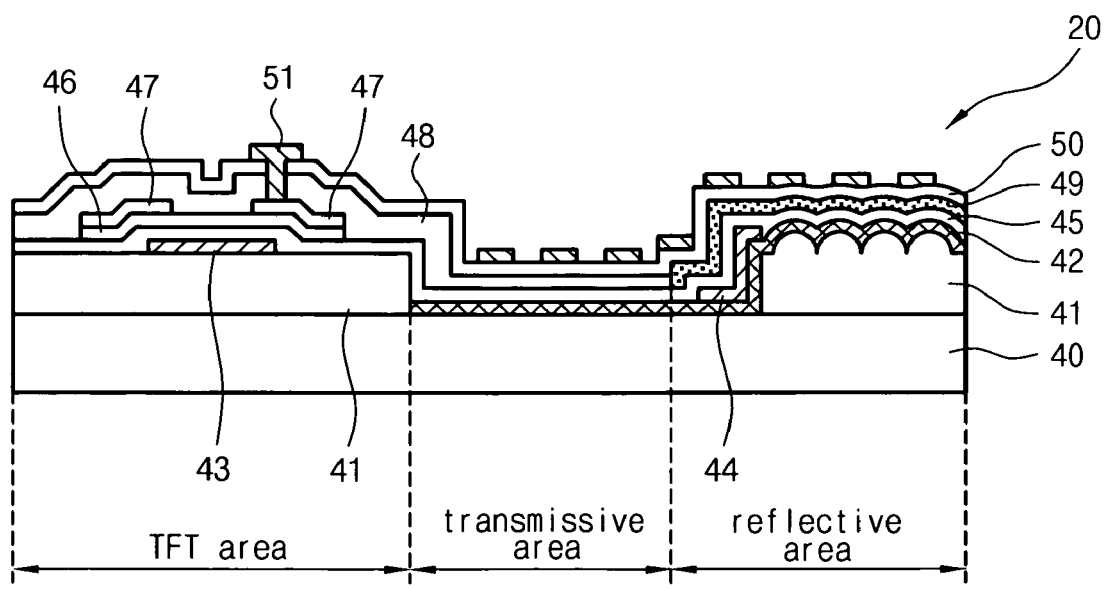

FIGS. 13 to 15 are plan and sectional views illustrating array pixel structures of the fringe field switching mode transflective liquid crystal display having the dual cell gap structure according to the first embodiment of the present invention.

According to the array pixel structure of the fringe field switching mode transflective liquid crystal display having the dual cell gap structure of the present invention, as shown in FIG. 13, the pixel electrode 51 including slits 51a provided in the reflective area has an inclination angle different from that of the pixel electrode provided in the transmittance area, thereby increasing the driving voltage.

In detail, when the rubbing is performed in a transverse direction, that is, when the rubbing is performed at a rubbing angle of 0°, if the inclination angle of the pixel electrode 51 formed in the reflective area is larger than that of the pixel electrode formed in the transmittance area, the driving voltage is increased, so that the V-R curve of the reflective area can match with the V-T curve of the transmittance area. Accordingly, when the voltage is applied to pixels, the same gray can be realized in both reflective and transmittance areas, so the image quality of the transflective FFS-LCD can be improved. Preferably, if an angle between the slit and the rubbing direction in the transmissive area is α, an angle between the slit and the rubbing direction in the reflective area is about α+10 to 40°.

In addition, since the cell gap of the reflective area is smaller than the cell gap of the transmissive area, the driving voltage may be reduced, so that the V-R curve of the reflective area does not match with the V-T curve of the transmissive area. To solve the above problem, the present invention increases the driving voltage by adjusting the width of the slit and the interval between the slits forming the pixel electrode in the FFS-LCD mode. In this case, the driving voltage of the reflective area may easily match with the driving voltage of the transmissive area, so the V-R curve of the reflective area matches with the V-T curve of the transmissive area.

In detail, if the slit width and the slit interval become reduced in the FFS mode, the driving voltage may be increased. For instance, if the slit width and the slit interval in the transmissive area are W' and I', and the slit width and the slit interval in the reflective area are W'–(0 to 2) μm and I'–(0 to 2) μm, respectively, the driving voltage of the reflective area may increase by 0.5 to 1V without causing loss of reflectance, so the driving voltage of the reflective area easily matches with the driving voltage of the transmissive area.

The fringe field switching mode transflective liquid crystal display having the dual cell gap structure according to the first embodiment of the present invention can be fabricated through 9-mask processes as follows:

As shown in FIG. 14, a transparent organic resin layer 41 having a thickness of about 600 to 2000 nm is formed on a lower substrate 40. Then, the organic resin layer 41 is etched by using a first mask, thereby opening the transmissive area. After that, a counter electrode 42 is formed on the organic resin layer 41 by using a second mask. At this time, the counter electrode 42 is formed over the whole area of the transmissive area while covering the reflective area except for a predetermined portion of the reflective area, which makes contact with the reflective plate in the following process.

After that, a first insulation layer 45 is formed on the entire surface of the substrate including the counter electrode 42. Then, a gate electrode 43 and a common line 44 are formed on the first insulation layer 45 by using a third mask. In addition, an active layer 46 is formed by means of a fourth mask and a source/drain electrode 47 is formed by means of a fifth mask. Subsequently, after forming a second insulation layer 48, a via hole (not shown) is formed in the second insulation layer 48 by using a sixth mask. Then, a reflective plate 49 is formed by means of a seventh mask. In addition, after forming a protective layer 50, a via hole (not shown) is formed in the protective layer 50 by using an eighth mask and the pixel electrode 51 is formed by using a ninth mask.

As shown in FIG. 15, it is also possible to form a plurality of embossing patterns (not shown) by etching the organic resin layer remaining in the reflective area by using an additional mask before the counter electrode 42 has been formed. In this case, the pixel electrode is formed on the embossing patterns by adjusting the slit width and the slit interval in the following process in such a manner that the driving voltage can be increased. Thus, the driving voltage of the reflective area may easily match with the driving voltage of the transmissive area. At this time, the embossing pattern has a diameter of about 3 to 10 μm and a height of about 700 to 800 nm from the etched surface of the organic resin layer. In addition, a distance between embossing patterns is at least 2 μm and the embossing pattern has an inclination angle of about 5 to 15°.

Figure 16:
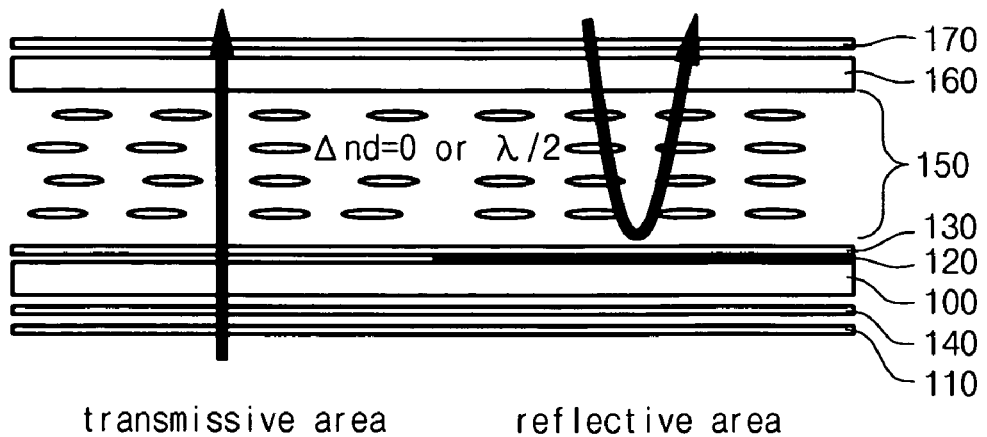
FIG. 16 is a view illustrating an optical cell structure of a fringe field switching mode transflective liquid crystal display having a single cell gap structure according to a second embodiment of the present invention.

FIG. 16 is a view illustrating an optical cell structure of a fringe field switching mode transflective liquid crystal display having a single cell gap structure according to a second embodiment of the present invention.

As shown in FIG. 16, the fringe field switching mode transflective liquid crystal display having the single cell gap structure according to the second embodiment of the present invention includes a reflective area and a transmissive area, wherein an upper substrate 160 is aligned in opposition to a lower substrate 100 by interposing a liquid crystal layer 150 therebetween. An upper polarizing plate 170 is aligned at an outer portion of the upper substrate 160. A reflective plate 120 is provided at an inner portion of the lower substrate 100 corresponding to the reflective area. An upper λ/4 plate 130 is provided between the reflective plate 120 and the liquid crystal layer 150. In addition, a lower polarizing plate 110 is aligned at an outer portion of the lower substrate 100 and a lower λ/4 plate 140 is provided between the lower substrate 100 and the lower polarizing plate 110. The upper and lower λ/4 plates 130 and 140 have a phase delay value of about 100 to 200 nm. A phase delay (Δn·d) of the liquid crystal layer 150 is 0 or λ/2. If the electric field is not applied to the liquid crystal layer 150 of the reflective area, the liquid crystal layer 140 presents the phase delay of 0. If the electric field is applied to the liquid crystal layer 150 of the reflective area, the phase delay is converged into λ/2.

The liquid crystal layer 150 of the transmissive area presents the phase delay of 0 if the electric field is not applied to the liquid crystal layer 150 of the transmissive area. If the electric field is applied to the liquid crystal layer 150 of the transmissive area, the phase delay is converged into λ/2. The liquid crystal layer 150 formed in the reflective and transmissive areas has the phase delay value of about 250 to 400 nm in order to cause the phase delay of about λ/2.

Figure 17:
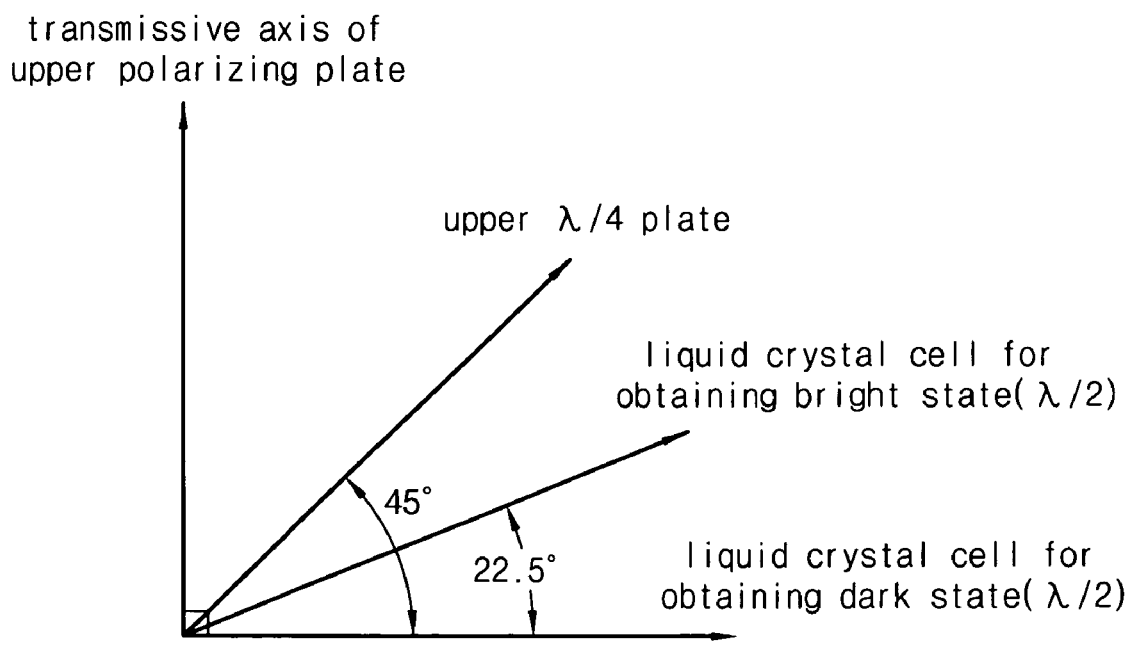
FIG. 17 is a view illustrating an optical axis of a reflective area provided in a fringe field switching mode transflective liquid crystal display having a single cell gap structure according to a second embodiment of the present invention.
Figure 18:
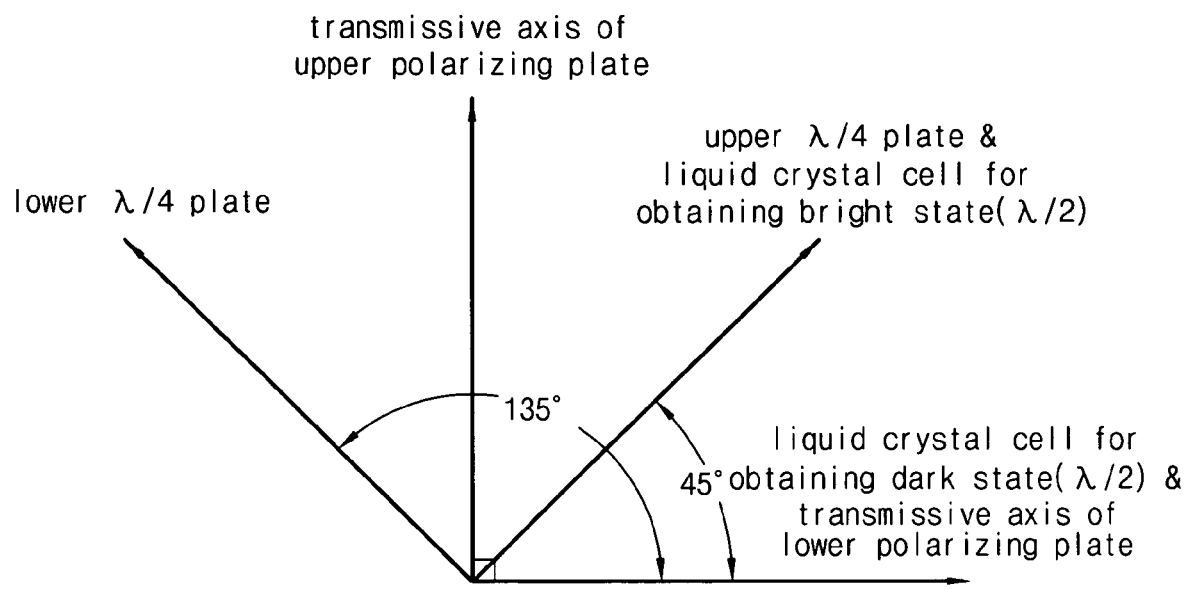
FIG. 18 is a view illustrating an optical axis of a transmissive area provided in a fringe field switching mode transflective liquid crystal display having a single cell gap structure according to a second embodiment of the present invention.

Under the above optical cell structure, each optical member has an optical axis as follows:

FIG. 17 is a view illustrating an optical axis of the reflective area provided in the fringe field switching mode transflective liquid crystal display having the single cell gap structure according to the second embodiment of the present invention, and FIG. 18 is a view illustrating an optical axis of the transmissive area provided in the fringe field switching mode transflective liquid crystal display having the single cell gap structure according to the second embodiment of the present invention. It can be understood from FIGS. 17 and 18 that the transmissive axis of the lower polarizing plate 110 matches with the initial rubbing direction of the liquid crystal and the transmissive axis of the upper polarizing plate 170 is orthogonal to the lower polarizing plate 110. In addition, the optical axis of the lower λ/4 plate 140 is orthogonal to the optical axis of the upper λ/4 plate 130 about the reflective plate 120. The lower λ/4 plate 140 forms an angle of 135° in relation to the initial rubbing direction of the liquid crystal and the upper λ/4 plate 130 forms an angle of 45° in relation to the initial rubbing direction of the liquid crystal.

Figure 19:
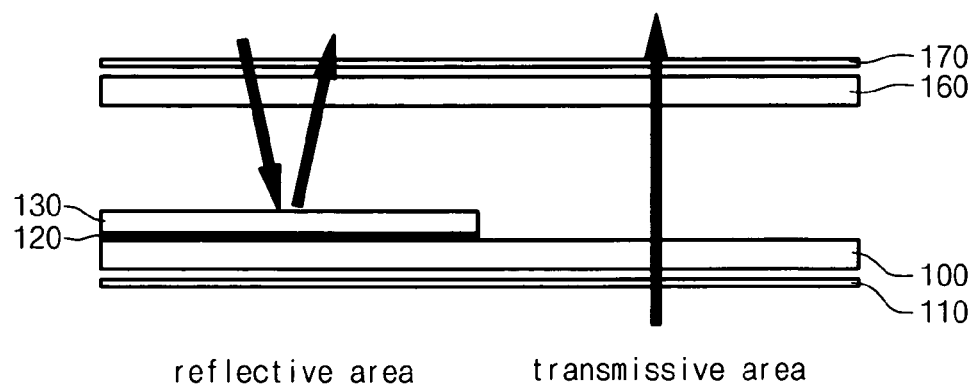
FIG. 19 is a view illustrating another optical cell structure of a fringe field switching mode transflective liquid crystal display having a single cell gap structure according to a second embodiment of the present invention.
Figure 20:
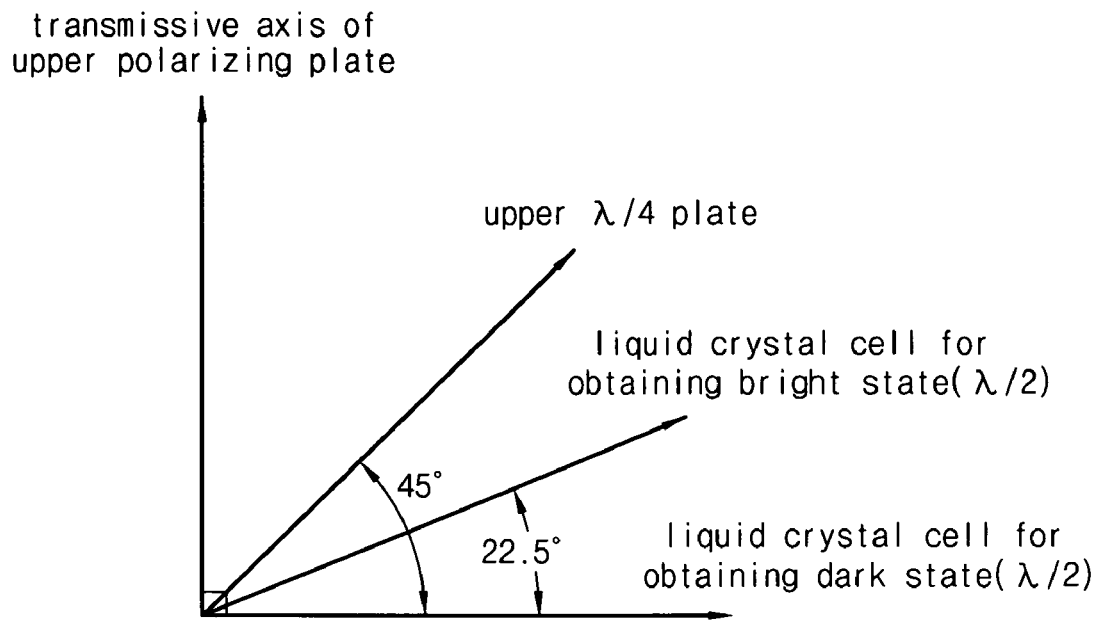
FIG. 20 is a view illustrating an optical axis of a reflective area provided in a fringe field switching mode transflective liquid crystal display having a single cell gap structure shown in FIG. 19.
Figure 21:
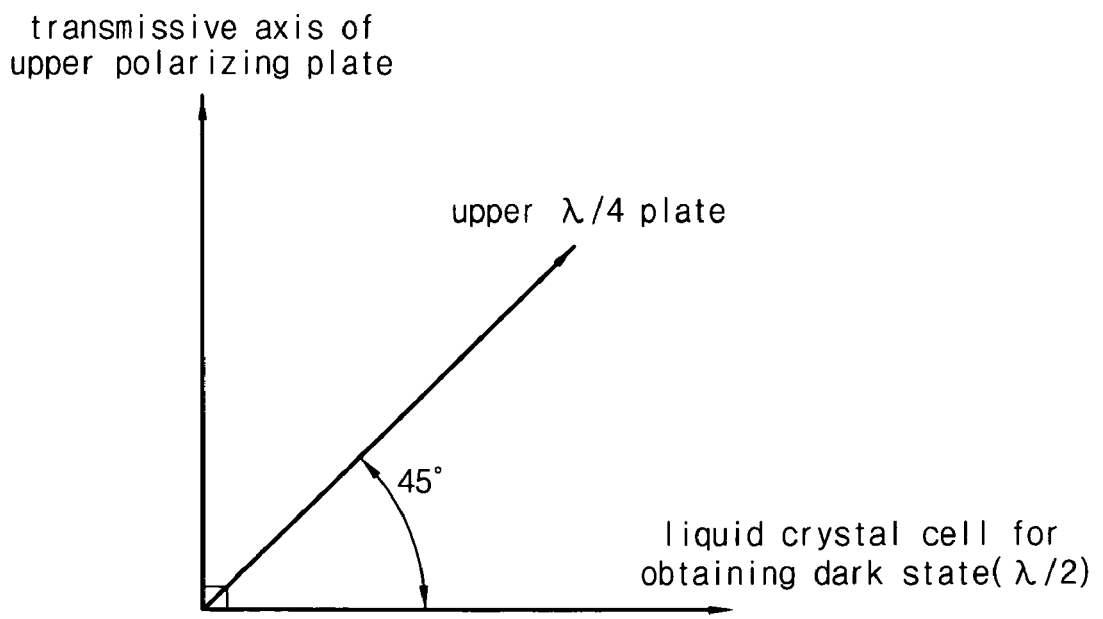
FIG. 21 is a view illustrating an optical axis of a transmissive area provided in a fringe field switching mode transflective liquid crystal display having a single cell gap structure shown in FIG. 19.

FIG. 19 is a view illustrating another optical cell structure of the fringe field switching mode transflective liquid crystal display having the single cell gap structure according to the second embodiment of the present invention, FIG. 20 is a view illustrating the optical axis of the reflective area provided in the fringe field switching mode transflective liquid crystal display having the single cell gap structure shown in FIG. 19, and FIG. 21 is a view illustrating the optical axis of the transmissive area provided in the fringe field switching mode transflective liquid crystal display having the single cell gap structure shown in FIG. 19.

As shown in FIG. 19, if the upper λ/4 plate 130 is formed only in the reflective area, it is not necessary to provide the lower λ/4 plate 140 at a lower portion of the reflective plate 120. It can be understood from FIGS. 20 and 21 that the transmissive axis of the lower polarizing plate 110 matches with the initial rubbing direction of the liquid crystal and the transmissive axis of the upper polarizing plate 170 is orthogonal to the lower polarizing plate 110. In addition, as shown in FIG. 21, the upper λ/4 plate 130 forms an angle of 45° in relation to the initial rubbing direction of the liquid crystal.

Figure 22:
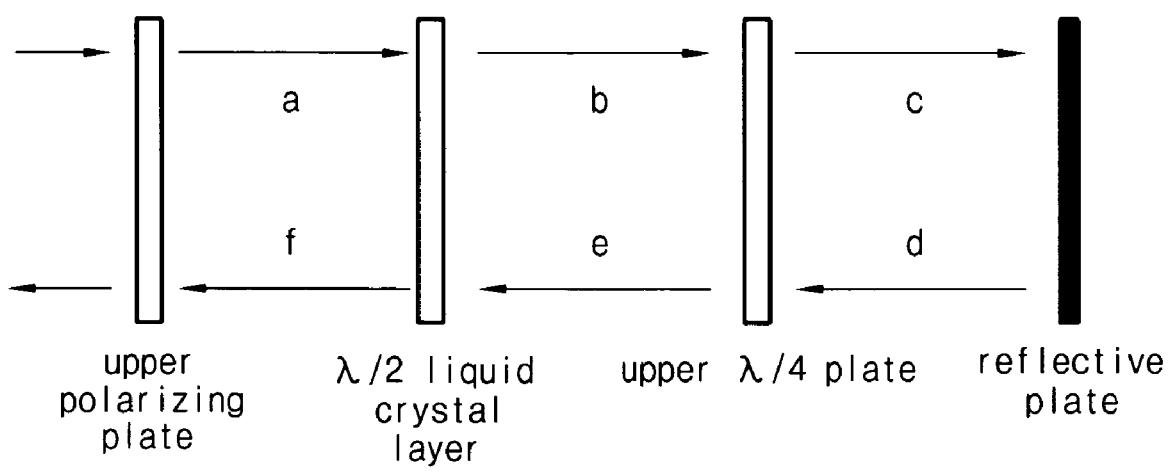
FIG. 22 is a view illustrating an operational principle of a reflective area provided in a fringe field switching mode transflective liquid crystal display having a single cell gap structure according to a second embodiment of the present invention.
Figure 23:
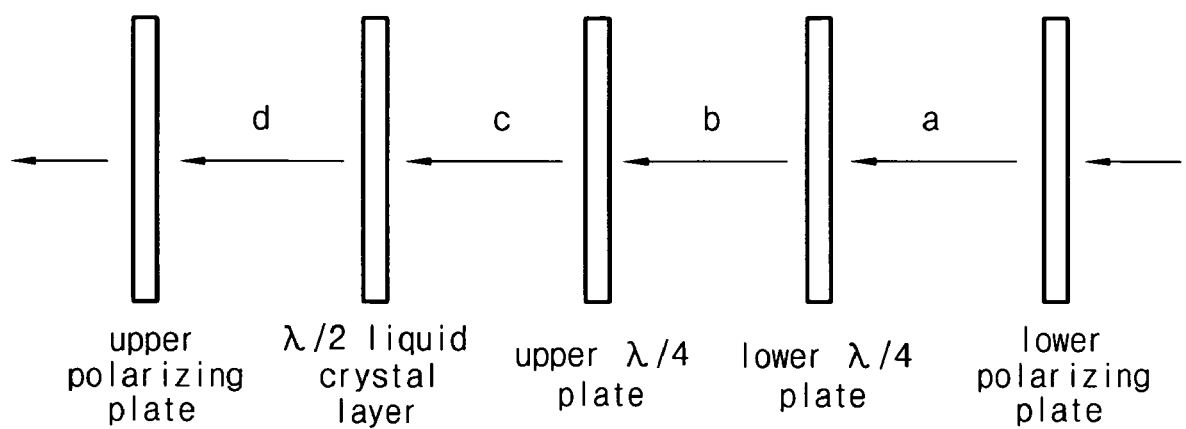
FIG. 23 is a view illustrating an operational principle of a transmissive area provided in a fringe field switching mode transflective liquid crystal display having a single cell gap structure according to a second embodiment of the present invention.

FIG. 22 is a view illustrating an operational principle of the reflective area provided in the fringe field switching mode transflective liquid crystal display having the single cell gap structure according to the second embodiment of the present invention, and FIG. 23 is a view illustrating an operational principle of the transmissive area provided in the fringe field switching mode transflective liquid crystal display having the single cell gap structure according to the second embodiment of the present invention. Hereinafter, the operational principles of the reflective and transmissive areas formed in the fringe field switching mode transflective liquid crystal display having the single cell gap structure according to the second embodiment of the present invention will be described with reference to the optical cell structure thereof shown in FIG. 16.

First, the operational principle of the reflective area will be described.

As shown in FIG. 22, in a case of the dark state, incident light is linearly polarized at an angle of 90° while passing through the upper polarizing plate 170 having the transmissive axis twisted at an angle of 90° (see, a in FIG. 22). Since the liquid crystal layer 150 is aligned with a polarizing angle of 0°, the polarizing state of the light may not change even if it passes through the liquid crystal layer 150 (see, b in FIG. 22). Then, the light is circularly polarized while passing through the upper λ/4 plate 130 provided at an upper end of the reflective plate 120 (see, c in FIG. 22) and is reflected from the reflective plate 120 (see, d in FIG. 22), so that the light again passes through the upper λ/4 plate 130. As a result, the light is linearly polarized at an angle of 0°, so that the light is twisted at an angle of 90° as compared with the initially incident light (see, e in FIG. 22). Thus, the light 150 passes through the liquid crystal layer 150 without changing the polarizing state thereof (see, f in FIG. 22) and is absorbed in the upper polarizing plate 170, thereby forming the dark state.

In addition, in a case of the bright state, the incident light is linearly polarized at an angle of 90° while passing through the upper polarizing plate 170 having the transmissive axis twisted at an angle of 90° (see, a in FIG. 22). Since the liquid crystal layer 150 plays the role of a λ/2 plate twisted at an angle of 22.5°, the light is linearly polarized at an angle of 135° while passing though the liquid crystal layer 150 (see, b in FIG. 22). Since the linearly polarized light is twisted from the optical axis of the upper λ/4 plate 130 at an angle of 90°, the optical axis of the linearly polarized light is not changed even if the linearly polarized light returns by passing through the upper λ/4 plate 130 (see, c, d and e in FIG. 22). Then, the light is again linearly polarized at an angle of 90° while passing through the liquid crystal layer 150 playing the role of the λ/2 plate (see, f in FIG. 22), thereby forming the bright state.

Hereinafter, the operational principle of the transmissive area will be described.

Figure 1:
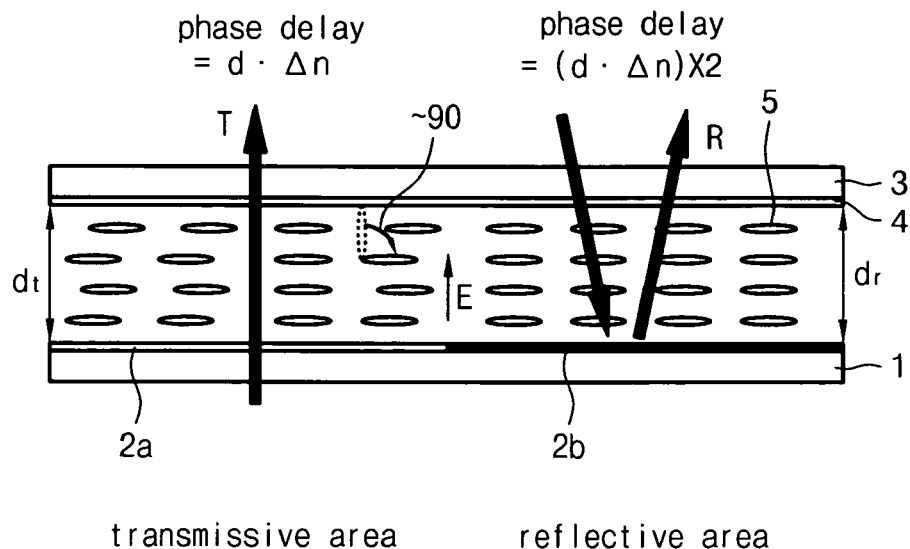
FIG. 1 is a sectional view illustrating a conventional transflective liquid crystal display having a single cell gap structure.
Figure 2:
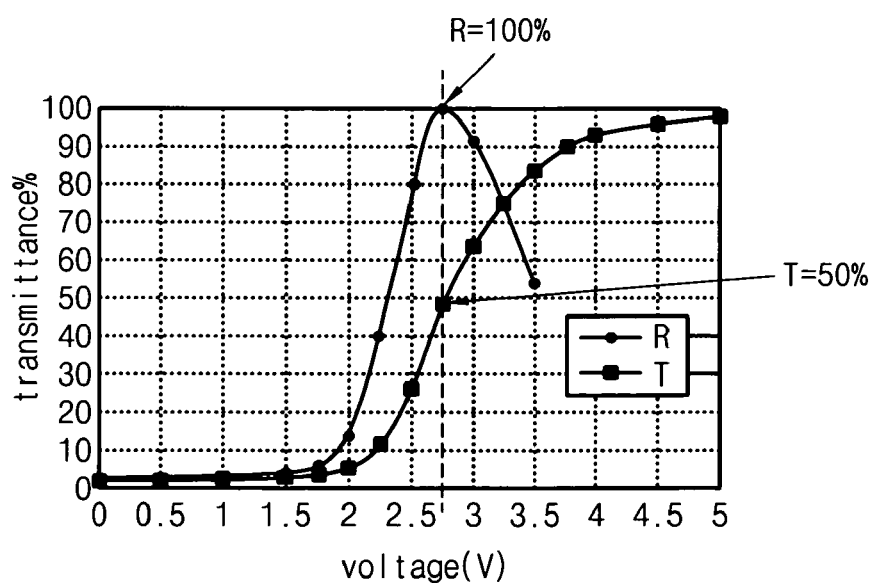
FIG. 2 is a graph illustrating a V-T curve in a transmissive mode and a V-R curve in a reflective mode in a conventional transflective liquid crystal display having a single cell gap structure.
Figure 3:
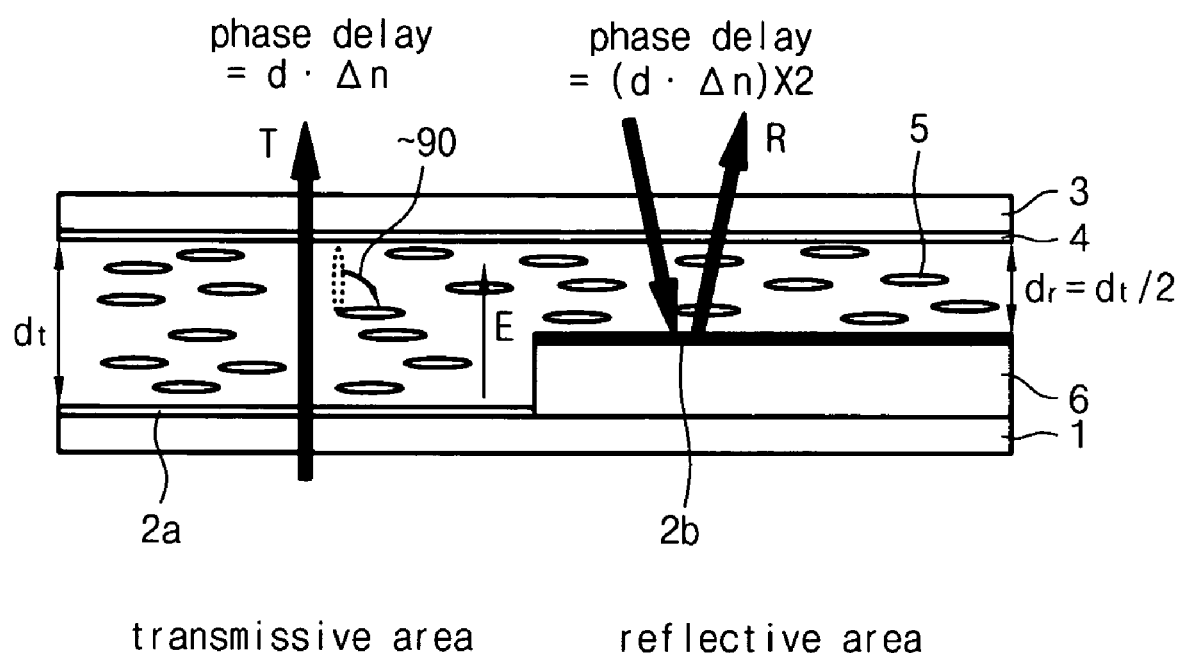
FIG. 3 is a sectional view illustrating a conventional transflective liquid crystal display having a dual cell gap structure.
Figure 4:
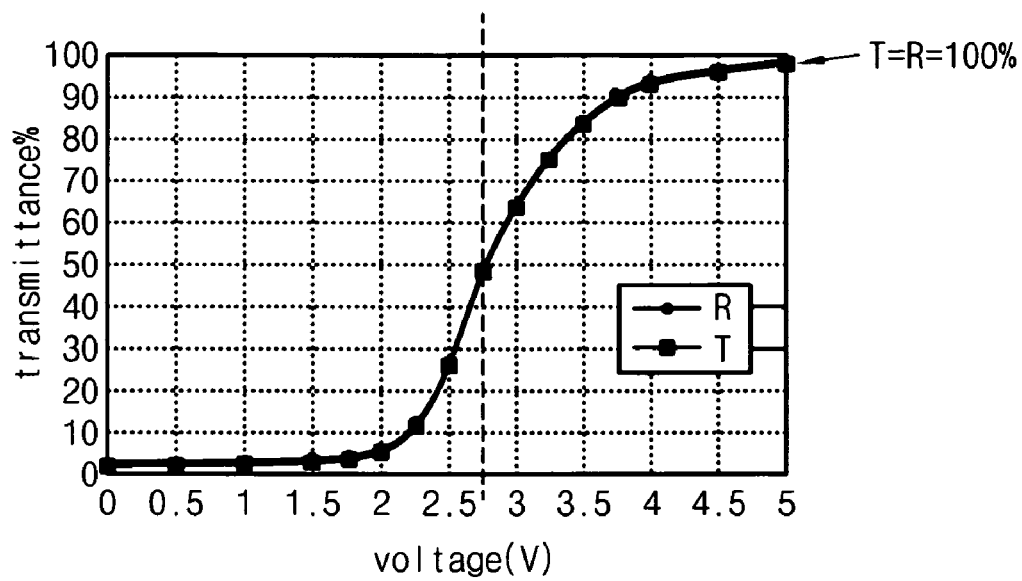
FIG. 4 is a graph illustrating a V-T curve in a transmissive mode and a V-R curve in a reflective mode in a conventional transflective liquid crystal display having a dual cell gap structure.

As shown in FIG. 1, in a case of the dark state, since the lower polarizing plate 110 is aligned with a polarizing angle of 0°, the polarizing state of the light may not change even if the light has passed through the lower polarizing plate 110 and two λ/4 plates 130 and 140 aligned orthogonally to each other (see, a, b and c in FIG. 23). In addition, since the liquid crystal layer 150 also has a polarizing angle of 0°, the polarizing state of the light may not change even if it passes through the liquid crystal layer 150 (see, d in FIG. 23), so that the light is absorbed in the upper polarizing plate 170, thereby forming the dark state.

In addition, in a case of the bright state, since the lower polarizing plate 110 is aligned with a polarizing angle of 0°, the polarizing state of the light may not change even if the light has passed through the lower polarizing plate 110 and two λ/4 plates 130 and 140 aligned orthogonally to each other (see, a, b and c in FIG. 23). In addition, since the liquid crystal layer 150 is aligned with a polarizing angle of 45°, the polarizing state of the light may be twisted by an angle of 90° after it has passed through the liquid crystal layer 150 (see, d in FIG. 23), so that the bright state can be obtained.

Figure 24:
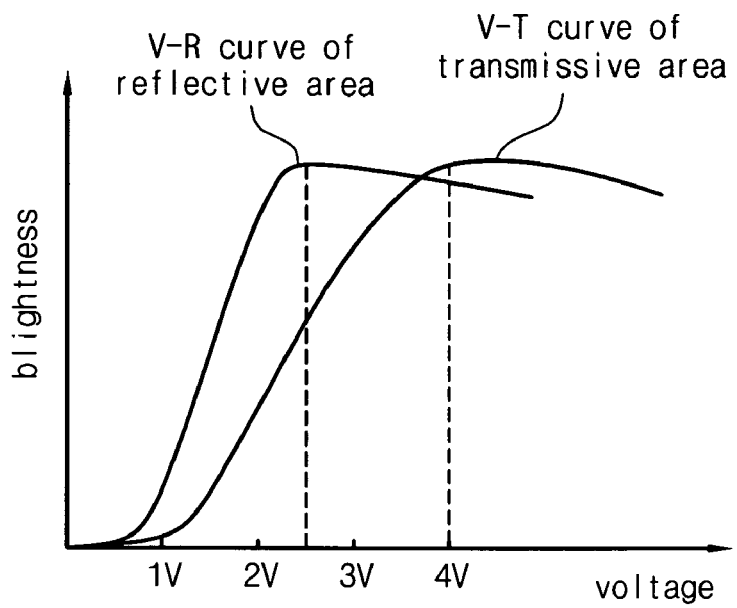
FIG. 24 is a graph illustrating a V-T curve in a transmissive mode and a V-R curve in a reflective mode in a fringe field switching mode transflective liquid crystal display having a single cell gap structure according to a second embodiment of the present invention.

There are various factors exerting a serious influence upon the transflective liquid crystal display having the single cell gap structure. Although the cell gap exerts the serious influence upon the driving voltage range in the transflective liquid crystal display having the dual cell gap structure, a twisting angle of the liquid crystal may exert the serious influence upon the driving characteristics of the transflective liquid crystal display having the single cell gap structure. That is, according to the transflective liquid crystal display having the single cell gap structure, the liquid crystal provided in the reflective area must be twisted at an angle of about 0 to 22.5°, and the liquid crystal provided in the transmissive area must be twisted at an angle of about 0 to 45° in order to obtain black and white states. For this reason, as shown in FIG. 24, the reflective area obtains the white state prior to the transmissive area, so that the V-R curve of the reflective area does not match with the V-T curve of the transmissive area. FIG. 24 is a graph illustrating the V-T curve of the transmissive area and the V-R curve of the reflective mode in the fringe field switching mode transflective liquid crystal display having the single cell gap structure according to the second embodiment of the present invention.

Therefore, it is necessary to match the driving range of the reflective area with that of the transmissive area.

FIGS. 25 to 29 are sectional views illustrating array pixel structures of the fringe field switching mode transflective liquid crystal display having the single cell gap structure according to the second embodiment of the present invention. According to the second embodiment of the present invention, the V-R curve of the reflective area matches with the V-T curve of the transmissive area by increasing the driving voltage using the array pixel structures shown in FIGS. 25 to 29.

Figure 25:
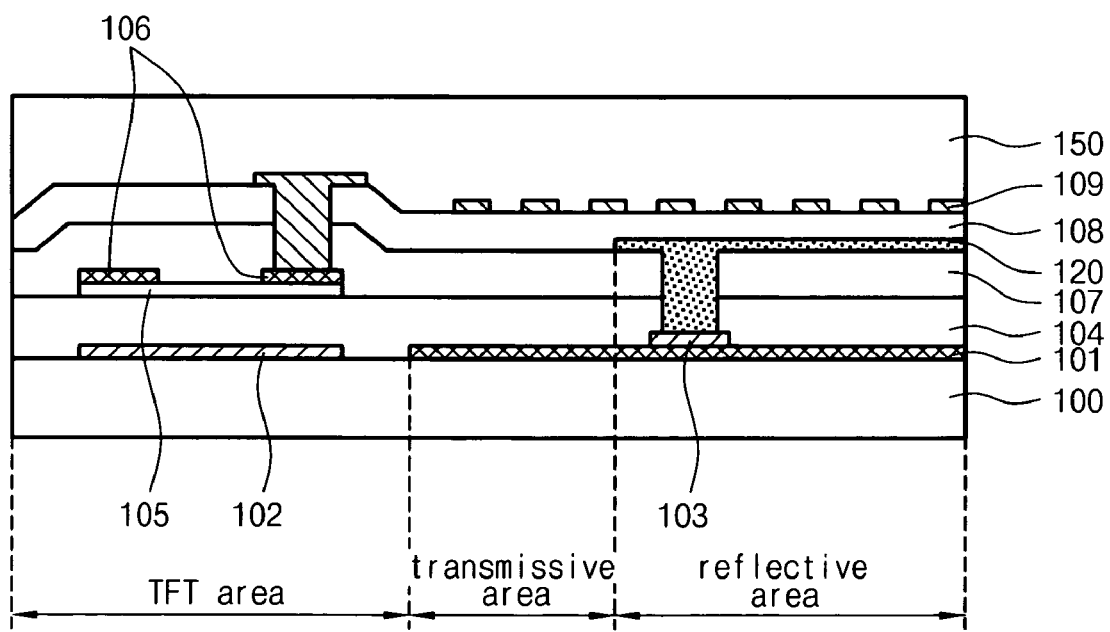
FIGS. 25 to 29 are sectional views illustrating array pixel structures of a fringe field switching mode transflective liquid crystal display having a single cell gap structure according to a second embodiment of the present invention.

As shown in FIG. 25, the array pixel structure of the fringe field switching mode transflective liquid crystal display having the single cell gap structure according to the second embodiment of the present invention includes the transmissive area used for displaying images by using the backlight unit and the reflective layer used for displaying images by using natural light. The same single cell gap structure is applied to both transmissive and reflective areas. In addition, an inclination angle of the pixel electrode in the form of a slit, a width of the slit and an interval between slits of the reflective area are different from those of the transmissive area, thereby increasing the driving voltage and matching the V-R curve of the reflective area with the V-T curve of the transmissive area.

In addition, although it is not illustrated in FIG. 25, a λ/4 plate can be positioned between the reflective plate 120 and the liquid crystal layer 150 in the reflective area in order to realize the optical system. The phase delay (Δn·d) of the liquid crystal layer 150 is in a range of about 0 to λ/2 in the reflective area and the transmissive area, respectively.

The fringe field switching mode transflective liquid crystal display having the single cell gap structure shown in FIG. 25 can be fabricated as follows:

First, a counter electrode 101 is formed on a substrate 100 through a first mask process and a gate electrode 102 and a common line 103 are sequentially formed on the lower substrate 100 through a second mask process. After that, a first insulation layer 104 is formed on the gate electrode 102 and the common line 103. In addition, after patterning an active layer 105 through a third mask process, a source/drain electrode 106 is formed through a fourth mask process. Subsequently, a second insulation layer 107 is formed on the entire surface of the source/drain electrode 106 and a first via hole (not shown) is formed in the second insulation layer 107 through a fifth mask process in order to form a contact for the reflective plate 120. After that, the reflective plate 120 is formed on the second insulation layer 107 through a sixth mask process in such a manner that the first via hole is covered with the reflective plate 120. In addition, a protective layer 108 is formed on the entire surface of the reflective plate 120. Then, the protective layer 108 is etched through a seventh mask process, thereby forming a second via hole (not shown). In addition, a pixel electrode 109 in the form of a slit is formed on the protective layer 108 through an eighth mask process. At this time, the inclination angle of the pixel electrode 109 formed in the reflective area is larger than the inclination angle of the pixel electrode 109 formed in the transmissive area. In addition, the slit width and the slit interval of the pixel electrode formed in the reflective area are different from those of the pixel electrode formed in the transmissive area. Reference numeral 150 shown in FIG. 25 represents the liquid crystal layer.

Figures 26, 27:
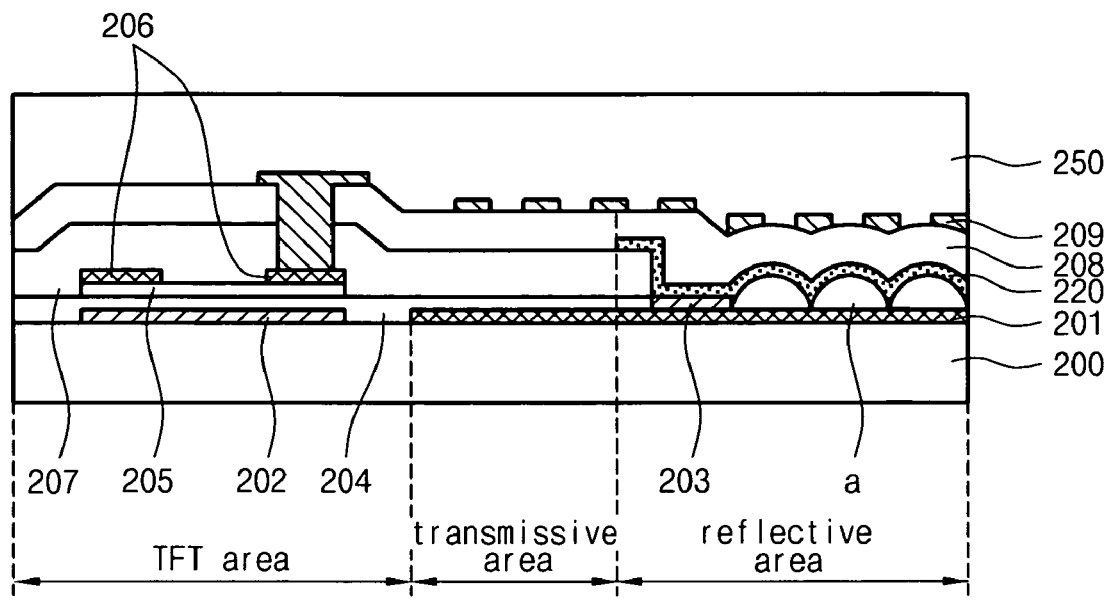

According to the array pixel structure for the fringe field switching mode transflective liquid crystal display having the single cell gap structure shown in FIG. 26, an organic resin layer having an embossing pattern is formed in the reflective area and the reflective plate is formed on the organic resin layer. In addition, the slit width and the slit interval of the pixel electrode formed in the reflective area are different from those of the pixel electrode formed in the transmissive area, so that the driving voltage is increased, thereby matching the V-R curve of the reflective area with the V-T curve of the transmissive area.

The fringe field switching mode transflective liquid crystal display having the single cell gap structure shown in FIG. 26 can be fabricated as follows:

First, a counter electrode 201 is formed on a substrate 200 through a first mask process and a gate electrode 202 and a common line 203 are sequentially formed on the substrate 200 through a second mask process. After that, a first insulation layer (not shown) is formed on the gate electrode 202 and the common line 203. In addition, after patterning an active layer 205 through a third mask process, a source/drain electrode 206 is formed through a fourth mask process. Subsequently, a second insulation layer (not shown) is formed on the entire surface of the source/drain electrode 206 and the first and second insulation layers are etched through a fifth mask process, thereby opening the reflective area. Reference numerals 204 and 207 shown in FIG. 26 represent first and second insulation layers remaining in the transmissive area after the etching process has been finished.

Then, an organic resin layer (not shown) is formed on the resultant substrate. The organic resin layer is etched through a sixth mask process in such a manner that the organic resin layer may selectively remain in the reflective area while forming a first via hole (not shown) in order to provide a contact for a reflective plate 220. Then, embossing patterns (a) are formed on the organic resin layer. At this time, the organic resin layer has a thickness of about 800 nm. In addition, the embossing pattern (a) has a diameter of about 5 to 10 μm and a height of about 700 to 800 nm. After that, the reflective plate 220 is formed through a seventh mask process. Then, after forming a protective layer 208 on the entire surface of the substrate including the reflective plate 220, a second via hole (not shown) is formed through an eighth mask process in order to form a contact for a pixel electrode 209. In addition, the pixel electrode 209 in the form of a slit is formed on the protective layer 208 through a ninth mask process. At this time, the inclination angle of the pixel electrode 209 formed in the reflective area is larger than the inclination angle of the pixel electrode 209 formed in the transmissive area. In addition, the slit width and the slit interval of the pixel electrode formed in the reflective area are different from those of the pixel electrode formed in the transmissive area.

Reference numeral 250 shown in FIG. 26 represents the liquid crystal layer.

The fringe field switching mode transflective liquid crystal display having the single cell gap structure shown in FIG. 27 can be fabricated as follows:

First, a gate electrode 301 and a common line 302 are sequentially formed on a substrate 300 through a first mask process. After that, a first insulation layer (not shown) is formed on the gate electrode 301 and the common line 302. In addition, after patterning an active layer 304 on the first insulation layer through a second mask process, a source/drain electrode 305 is formed through a third mask process. Subsequently, a second insulation layer (not shown) is formed on the entire surface of the source/drain electrode 305 and the first and second insulation layers are etched through a fourth mask process, thereby forming a first via hole (not shown) for exposing the common line 302. Reference numerals 303 and 306 shown in FIG. 27 represent first and second insulation layers remaining after the etching process has been finished.

After that, a counter electrode 307 is formed on the second insulation layer of the reflective area through a fifth mask process such that the first via hole is covered with the counter electrode 307. Then, a reflective plate 310 is formed through a sixth mask process. The reflective plate 310 includes a Mo/Al layer.

Then, after forming a protective layer 308 on the entire surface of the substrate including the reflective plate 310, a second via hole (not shown) is formed through a seventh mask process. In addition, a pixel electrode 309 in the form of a slit is formed on the protective layer 308 through an eighth mask process. At this time, the inclination angle of the pixel electrode 309 formed in the reflective area is larger than the inclination angle of the pixel electrode formed in the transmissive area. In addition, the slit width and the slit interval of the pixel electrode formed in the reflective area are different from those of the pixel electrode formed in the transmissive area. Reference numeral 350 shown in FIG. 27 represents the liquid crystal layer.

Figure 28:
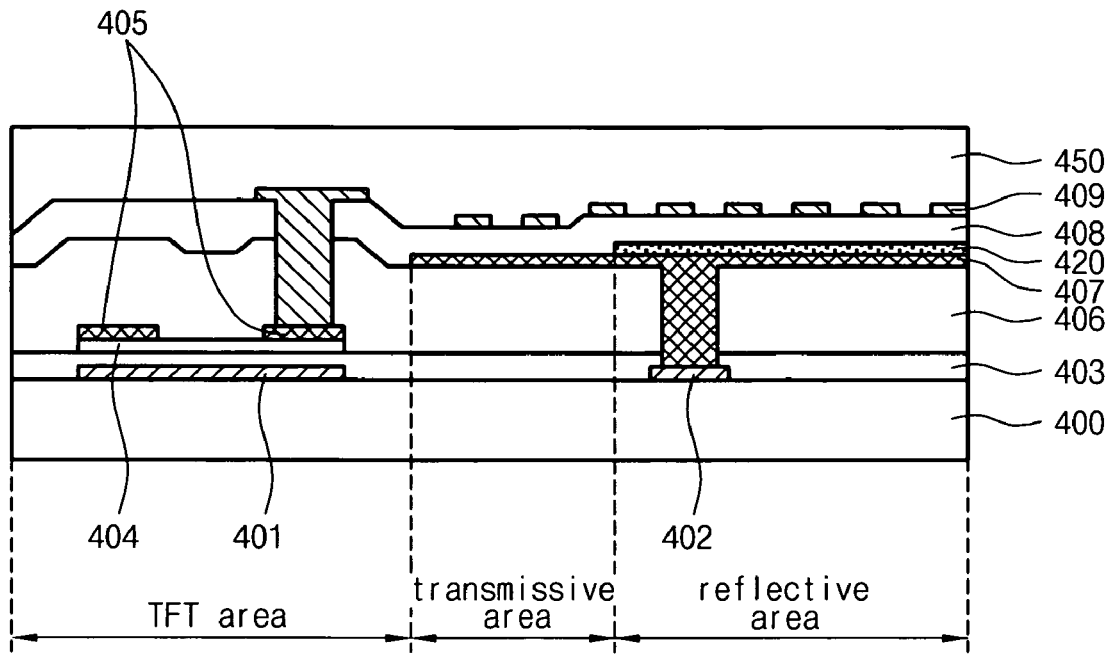

The fringe field switching mode transflective liquid crystal display having the single cell gap structure shown in FIG. 28 can be fabricated as follows:

First, a gate electrode 401 and a common line 402 are sequentially formed on a substrate 400 through a first mask process. After that, a first insulation layer 403 is formed on the gate electrode 401 and the common line 402. In addition, after patterning an active layer 404 on the first insulation layer 403 through a second mask process, a source/drain electrode 405 is formed through a third mask process. Subsequently, a second insulation layer 406 is formed on the entire surface of the source/drain electrode 405 and the first and second insulation layers 403 and 406 are etched through a fourth mask process, thereby forming a first via hole (not shown) for exposing the common line 402.

After that, a counter electrode 407 is formed on the reflective area through a fifth mask process and a reflective plate 420 is formed through a sixth mask process. The reflective plate 420 includes a Mo/Al layer.

Then, after forming a protective layer 408 on the entire surface of the substrate including the reflective plate 420, a second via hole (not shown) is formed through a seventh mask process. In addition, a pixel electrode 409 in the form of a slit is formed on the protective layer 408 through an eighth mask process. At this time, the inclination angle of the pixel electrode formed in the reflective area is larger than the inclination angle of the pixel electrode formed in the transmissive area. In addition, the slit width and the slit interval of the pixel electrode formed in the reflective area are different from those of the pixel electrode formed in the transmissive area. Reference numeral 450 shown in FIG. 28 represents the liquid crystal layer.

Figure 29:
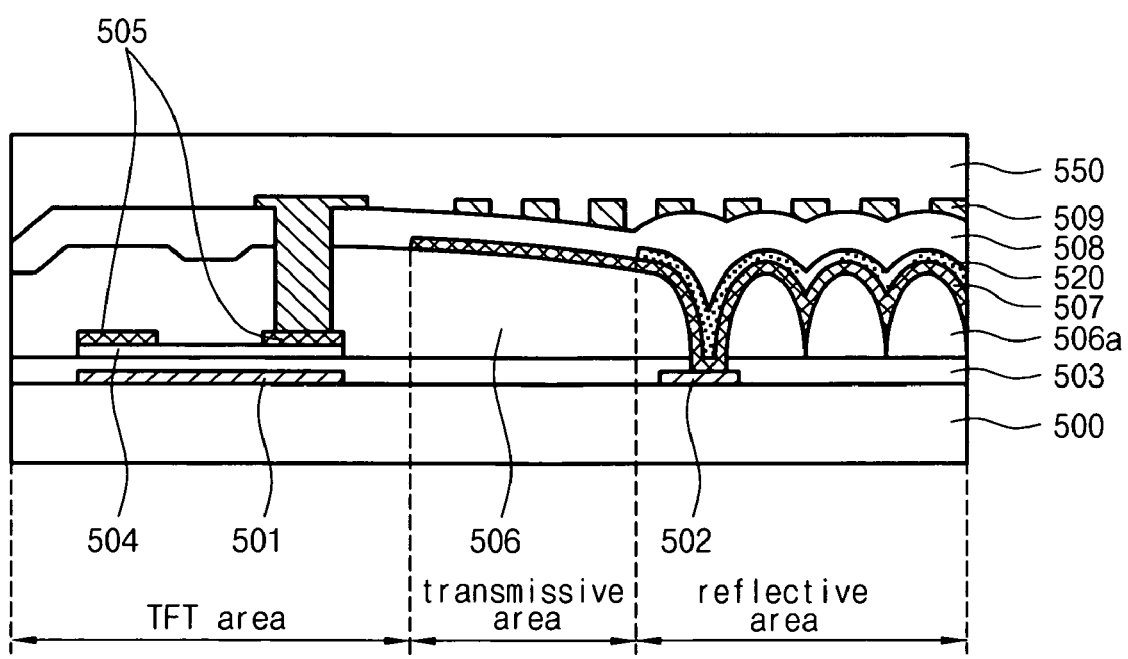

According to the array pixel structure for the fringe field switching mode transflective liquid crystal display having the single cell gap structure shown in FIG. 29, a counter electrode connected to a common line is formed on a gate electrode and the common line and an organic resin layer having an embossing pattern is formed in the reflective area. In addition, the slit width and the slit interval of the pixel electrode formed in the reflective area are different from those of the pixel electrode formed in the transmissive area, so that the driving voltage is increased, thereby matching the V-R curve of the reflective area with the V-T curve of the transmissive area.

The fringe field switching mode transflective liquid crystal display having the single cell gap structure shown in FIG. 29 can be fabricated as follows:

First, a gate electrode 501 and a common line 502 are sequentially formed on a substrate 500 through a first mask process. Then, after forming an insulation layer 503 on the gate electrode 501 and the common line 502, second and third mask processes are sequentially performed in order to form an active layer 504 and a source/drain electrode 505. Subsequently, an organic resin layer 506 is formed on the entire surface of the source/drain electrode 505. Then, the organic resin layer 506 is etched through a fourth mask process in such a manner that the organic resin layer 506 may selectively remain in the reflective area while forming a first via hole (not shown) in order to provide contact for a reflective plate 520. An embossing pattern is formed on the surface of the organic resin layer 506. At this time, the organic resin layer has a thickness of about 600 to 1000 nm.

After that, a counter electrode 507 connected to the common line 502 is formed on the organic resin layer 506 through a fifth mask process such that the first via hole is covered with the counter electrode 507. Then, the reflective plate 520 is formed through a sixth mask process. In addition, after forming a protective layer 508 on the entire surface of the substrate including the reflective plate 520, a second via hole (not shown) is formed by etching the protective layer 508 through a seventh mask process, thereby forming a contact for a pixel electrode 509. The pixel electrode 509 in the form of a slit is formed on the protective layer 508 through an eighth mask process. At this time, the inclination angle of the pixel electrode formed in the reflective area is larger than the inclination angle of the pixel electrode formed in the transmissive area. In addition, the slit width and the slit interval of the pixel electrode formed in the reflective area are different from those of the pixel electrode formed in the transmissive area.

Although it is not illustrated in FIGS. 26 and 29, a λ/4 plate can be positioned between the reflective plate and the liquid crystal layer in the reflective area in order to realize the optical system.

According to the present invention, the driving voltage of the fringe field switching mode transflective liquid crystal display having the single cell gap structure or the dual cell may increase when the inclination angle, the slit width and the slit interval of the pixel electrode formed in the reflective area are different from those of the pixel electrode formed in the transmissive area. In detail, when the inclination angle of the pixel electrode formed in the reflective area is larger than that of the pixel electrode formed in the transmissive area, the driving voltage is increased.

As mentioned above, the present invention increases the driving voltage of the fringe field switching mode transflective liquid crystal display having the single cell gap structure or the dual cell by setting the inclination angle, the slit width and the slit interval of the pixel electrode formed in the reflective area differently from those of the pixel electrode formed in the transmissive area, thereby effectively matching the V-R curve of the reflective area with the V-T curve of the transmissive area. Accordingly, electro-optical characteristics of the reflective and transmissive areas can be improved, so that the fringe field switching mode transflective liquid crystal display may display high quality images. In addition, according to the present invention, the transflective liquid crystal display can display images in a fringe field switching mode, so the transflective liquid crystal display according to the present invention can display the images with wide viewing angles.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fringe field switching mode transflective liquid crystal display having a dual cell gap structure, in which a cell gap of a transmissive area is different from a cell gap of a reflective area, the fringe field switching mode transflective liquid crystal display comprising:

a lower substrate having a counter electrode and a pixel electrode embodied as plurality of slits in respective transmissive and reflective areas;

an upper substrate aligned in opposition to the lower substrate;

a liquid crystal layer interposed between the lower and upper substrates;

an upper polarizing plate aligned at an outer portion of the upper substrate;

a lower polarizing plate aligned at an outer portion of the lower substrate;

a reflective plate provided at an inner portion of the lower substrate in the reflective area by interposing an organic resin layer therebetween;

a lower λ/2 plate provided between the lower substrate having the reflective plate and the lower polarizing plate; and an upper λ/2 plate provided between the upper substrate and the upper polarizing plate, wherein an inclination angle, of slits in the pixel electrode formed in the reflective area are, larger than the inclination angle of slits in the pixel electrode formed in the transmissive area by about 10 to 40°, a phase delay of the liquid crystal layer formed in the reflective area is in a range of about 0 to $\lambda/4$, and a phase delay of the liquid crystal layer formed in the transmissive area in a range of about 0 to $\lambda/2$.

2. The fringe field switching mode transflective liquid crystal display as claimed in claim 1, wherein the slit width and the slit interval of the pixel electrode formed in the reflective area are identical to those of the pixel electrode formed in the transmissive area by less than 2 μm.

3. The fringe field switching mode transflective liquid crystal display as claimed in claim 1, wherein a slit width and a slit interval of the pixel electrode formed in the reflective area are smaller than those of the pixel electrode formed in the transmissive area by less than 2 μm.

4. The fringe field switching mode transflective liquid crystal display as claimed in claim 1, wherein a phase delay value of the upper and lower $\lambda/2$ plates is about 250 to 400 nm.

5. The fringe field switching mode transflective liquid crystal display as claimed in claim 1, wherein the liquid crystal layer has a phase delay value of about 100 to 200 nm in the reflective area.

6. The fringe field switching mode transflective liquid crystal display as claimed in claim 1, wherein the liquid crystal layer has a phase delay value of about 250 to 400 nm in the transmissive area.

7. The fringe field switching mode transflective liquid crystal display as claimed in claim 1, wherein a transmissive axis of the lower polarizing plate matches with a transmissive axis of the upper polarizing plate, and optical axes of the upper and lower $\lambda/2$ plates are twisted from transmissive axes of the upper and lower polarizing plates at an angle of 15°.

8. The fringe field switching mode transflective liquid crystal display as claimed in claim 1, wherein the organic resin layer is formed at an upper surface thereof with a plurality of embossing patterns.

9. The fringe field switching mode transflective liquid crystal display as claimed in claim 1, wherein the organic resin layer has a thickness of about 600 to 2000 nm.

10. The fringe field switching mode transflective liquid crystal display as claimed in claim 8, wherein the embossing pattern has a diameter of about 3 to 10 μm and a height of about 700 to 800 nm from the upper surface of the organic resin layer.

11. The fringe field switching mode transflective liquid crystal display as claimed in claim 8, wherein a distance between the embossing patterns is at least 2 μm.

12. The fringe field switching mode transflective liquid crystal display as claimed in claim 8, wherein the embossing pattern has an inclination angle of about 5 to 15°.

* * * * *